United States Patent
Sakane et al.

(10) Patent No.: US 10,214,125 B2
(45) Date of Patent: Feb. 26, 2019

(54) AIR-CIRCULATION PROMOTION APPARATUS FOR VEHICLE

(71) Applicant: DENSO CORPORATION, Kariya, Aichi-pref. (JP)

(72) Inventors: Hiroyuki Sakane, Anjo (JP); Yasuhiko Niimi, Handa (JP); Yuuji Yamanaka, Kariya (JP); Akira Oga, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 252 days.

(21) Appl. No.: 14/436,974

(22) PCT Filed: Sep. 25, 2013

(86) PCT No.: PCT/JP2013/005667
§ 371 (c)(1),
(2) Date: Apr. 20, 2015

(87) PCT Pub. No.: WO2014/068840
PCT Pub. Date: May 8, 2014

(65) Prior Publication Data
US 2015/0266404 A1    Sep. 24, 2015

(30) Foreign Application Priority Data

Oct. 29, 2012 (JP) .................................. 2012-237982
May 16, 2013 (JP) .................................. 2013-104094

(51) Int. Cl.
*B60H 1/24* (2006.01)
*B60N 2/56* (2006.01)
(Continued)

(52) U.S. Cl.
CPC ....... *B60N 2/5628* (2013.01); *B60H 1/00285* (2013.01); *B60H 1/241* (2013.01);
(Continued)

(58) Field of Classification Search
CPC .. B60N 2/4876; B60N 2/5628; B60N 2/5635; B60N 2/5657; B60N 2/879;
(Continued)

(56) References Cited

U.S. PATENT DOCUMENTS 2,234,268 A * 3/1941 McCollum ............. B60H 1/247
                                                    237/12.3 C
2006/0172679 A1 * 8/2006 Gehring ............... B60H 1/3421
                                                    454/152
(Continued)

FOREIGN PATENT DOCUMENTS

DE    10 2007 002 001    7/2008
FR         2843916       3/2004
(Continued)

OTHER PUBLICATIONS

International Search Report and Written Opinion (in Japanese with English Translation) for PCT/JP2013/005667, dated Nov. 5, 2013; ISA/JP.

*Primary Examiner* — Gregory Huson
*Assistant Examiner* — Dana Tighe
(74) *Attorney, Agent, or Firm* — Harness, Dickey & Pierce, P.L.C.

(57) ABSTRACT

An air-circulation promotion apparatus for a vehicle includes a driver's seat and a front passenger seat provided in the vehicle, and a face outlet port of a vehicle air conditioner disposed in front of those seats. A seat outlet port that blows a sucked air from a side surface of a seat back of the seat toward a rear area of the vehicle is disposed in the seat. An air present between the face outlet port and the seat flows rearward of the seat by aid of wind blown out of the seat outlet port. This makes it possible to circulate a comfortable air rearward of the seat to create a vehicle interior environment having no air retention. A circulation fan is (Continued)

provided in the seat and can be integrated with a seat ventilation system or a seat air conditioner.

20 Claims, 20 Drawing Sheets

(51) Int. Cl.
  *B60H 1/00* (2006.01)
  *B60N 2/879* (2018.01)
(52) U.S. Cl.
  CPC .............. *B60H 1/246* (2013.01); *B60H 1/247* (2013.01); *B60N 2/5635* (2013.01); *B60N 2/5657* (2013.01); *B60N 2/879* (2018.02); *B60H 2001/003* (2013.01)
(58) Field of Classification Search
  CPC .... B60H 1/00285; B60H 1/241; B60H 1/246; B60H 1/247; B60H 2001/003
  USPC ................................. 454/120, 139, 152, 163
  See application file for complete search history.

(56) References Cited

U.S. PATENT DOCUMENTS

| 2008/0248736 A1* | 10/2008 | Aoki .................. B60H 1/00742 454/75 |
| 2012/0129439 A1 | 5/2012 | Ota et al. |
| 2013/0252528 A1 | 9/2013 | Yajima et al. |

FOREIGN PATENT DOCUMENTS

| JP | S60053613 U | 4/1985 |
| JP | S60081112 | 6/1985 |
| JP | S63002759 A | 1/1988 |
| JP | H01081960 U | 6/1989 |
| JP | 2004114897 A | 4/2004 |
| JP | 2004268773 A | 9/2004 |
| JP | 2010052494 A | 3/2010 |
| JP | 2010142274 A | 7/2010 |
| JP | 2011189764 A | 9/2011 |
| JP | 2012111318 A | 6/2012 |
| JP | 2012121482 A | 6/2012 |

* cited by examiner

COMPARATIVE EXAMPLE

AIR-CIRCULATION PROMOTION APPARATUS FOR VEHICLE

CROSS REFERENCE TO RELATED APPLICATIONS

This application is a U.S. National Phase Application under 35 U.S.C. 371 of International Application No. PCT/JP2013/005667 filed on Sep. 25, 2013 and published in Japanese as WO 2014/068840 A1 on May 8, 2014. This application is based on and claims the benefit of priority from Japanese Patent Applications No. 2012-237982 filed on Oct. 29, 2012, and No. 2013-104094 filed on May 16, 2013. The entire disclosures of all of the above applications are incorporated herein by reference.

TECHNICAL FIELD

The present disclosure relates to an air-circulation promotion apparatus for a vehicle, which leads air in a front area of a vehicle interior toward a rear area of the vehicle interior by a wind blowing out of a seat.

BACKGROUND ART

Conventionally, a vehicle seat (also called simply "seat") disclosed in Patent Document 1 has been known. This apparatus is configured to efficiently circulate air for air-conditioning a space surrounding a vehicle seat, thereby effectively adjusting a temperature of the space surrounding the vehicle seat.

Therefore, an external shape of a surface supporting a seated person in a seat cushion and a seat back includes a top part having a substantially planar central portion for supporting the seated person, and a bank part having portions that are positioned on both sides of the top part and protrude higher than the top part. This vehicle seat is equipped with an air conditioner within the seat. The air conditioner includes an outlet port, an inlet port, a duct and a blower, and the outlet port and the inlet port are formed in the bank part of the seat cushion or the seat back. The outlet port and the inlet port are located at a circulatable position where a blowing air blown out of the outlet port can be sucked into the inlet port. This configuration promotes convection around an occupant seated in the seat.

PRIOR ART DOCUMENT

Patent Document

Patent Document 1: JP 2010-142274 A

SUMMARY OF THE INVENTION

The seat air conditioner has a suction region and a blowout region, and in order to effectively obtain the comfort of the occupant, a layout of the inlet port and the outlet port is important. According to the study of the inventors of the present application, in the above Patent Document 1, there is a need to blow an air warmed by the occupant toward a region where no occupant is present outside the seat. The blown wind may be recognized as unnecessary and may not be utilized.

On the other hand, as compared to front seats in the vehicle compartment, comfortable air may not be circulated to rear seats. For example, in the front seat, air is blown out of the outlet port of the vehicle air conditioner, and even when the vehicle air conditioner does not operate, wind is guided into the vehicle interior by aid of a pressure (ram pressure) during traveling at high speed. In addition, ventilation is easily freely performed by the occupant's operation. Therefore, there is room to improve the comfort of the vehicle interior with the circulation of the air from the front seat.

It is an objective of the present disclosure is to provide an air-circulation promotion apparatus for a vehicle, the apparatus being capable of circulating air from a front area of a vehicle interior to a rear area of the vehicle interior.

The contents of the patent document listed as the prior art can be introduced or incorporated by reference as a description of technical elements described in the present specification.

According to a first aspect of the present disclosure, an air-circulation promotion apparatus for a vehicle includes a seat disposed in the vehicle, and a seat outlet port provided in the seat. The seat outlet port is provided in at least one of a corner portion and a side surface of the seat, and the side surface extends in a front-rear direction of the vehicle. The seat outlet port is configured to draw an air in a front area of the vehicle and blow the air toward a rear area of the vehicle or diagonally toward the rear area of the vehicle.

Accordingly, since the air is induced to flow toward the rear area of the vehicle with the use of viscosity of the air blown out of the seat outlet port, the air travels from the front area of the vehicle toward the rear area of the vehicle along the air flow. This allows comfortable air to be conveyed to the rear area of the vehicle, and the comfort of the vehicle interior can be improved.

According to a second aspect of the present disclosure, the seat outlet port may be provided in the corner portion of a seat back of the seat, and may blow the air diagonally toward the rear area of the vehicle. Accordingly, the air can be conveyed from the front area of the vehicle toward the rear area of the vehicle.

According to a third aspect of the present disclosure, the seat outlet port may be provided in the side surface of a seat back of the seat, and the side surface of the seat back may extend in the front-rear direction of the vehicle. The seat outlet port may blow the air from the side surface of the seat back toward the rear area of the vehicle or diagonally toward the rear area of the vehicle.

Accordingly, the seat outlet port, which blows the sucked air from the side surface of the seat back toward the rear area thereof, is disposed in the seat. The wind blown out of the seat outlet port enables a part of the air to flow to the rearward of the seat from the front area of the vehicle toward the rear area of the vehicle. Therefore, the comfortable air can be circulated toward the rear side of the seat, and a vehicle interior environment having no air retention can be created.

According to a fourth aspect of the present disclosure, the air-circulation promotion apparatus may further include a vehicle air conditioner that is disposed frontward of the seat and includes a face outlet port. The air-circulation promotion apparatus may further include a control unit that controls the seat outlet port to blow an air along a flow of conditioned air blown out of the face outlet port when the conditioned air is blown out of the face outlet port toward the rear area of the vehicle during operation of the vehicle air conditioner.

Accordingly, the conditioned air from the face outlet port can be conveyed to the rear area of the vehicle due to the wind blown out of the seat outlet port with the use of the viscosity of air.

According to a fifth aspect of the present disclosure, the control unit may control the seat outlet port to blow the air when an operation mode of the vehicle air conditioner is a face mode in which the air is blown out of the face outlet port.

Accordingly, since wind is blown out of the seat outlet port on condition of the face mode in which air is blown out of the face outlet port, blowing of wind from the seat outlet port, which does not result in favorable circulation of conditioned air, can be limited.

According to a sixth aspect of the present disclosure, the circulation fan may have an in-seat fan incorporated into the seat. The air-circulation promotion apparatus may further include an air flow switching device that switches an air flow from the in-seat fan to either an air flow blown out through a seat skin of the seat or an air flow blown out through the seat outlet port.

Accordingly, the air switching device switches the air to either an air passing through the seat skin of the seat or an air passing through the seat outlet port. Hence, while the occupant who sits in the seat can be made to be comforted, the comfort air present in the front area of the vehicle can be circulated to the rear area of the vehicle as occasion demands, thereby making it possible to create the comfortable vehicle interior environment having no air retention.

According to a seventh aspect of the present disclosure, the air-circulation promotion apparatus may further include a swing louver disposed in the face outlet port, a sensor that detects motion of the swing louver, and a louver drive device that controls motion of a seat louver according to a signal from the sensor.

Accordingly, the wind is blown out of the seat outlet port to the rear area in accordance with the motion of the swing louver. This makes it possible to blow the wind from the seat outlet port to the rear area of the vehicle in accordance with the comfortable air blown out of the face outlet port toward the rear area of the vehicle so that the comfortable air can be directed toward the rear area of the vehicle as much as possible.

According to an eighth aspect of the present disclosure, the vehicle air conditioner may include a side vent outlet port that blows the air to a lateral side of the vehicle. The seat outlet port may be provided in the side surface of the seat, and the side surface is positioned adjacent to the lateral side of the vehicle. The seat outlet port may blow the air rearward from the side surface of the seat and may assist the air flow blown out of the side vent outlet port rearward.

Accordingly, the seat outlet port causes the air to be blown rearward from the side surface which is located on a side of the seat toward a window and is adjacent to the lateral side of the vehicle. Since the air that is blown out of the side vent outlet port and present around the front side seat can be made to flow to the rear area of the vehicle along the window side by the aid of the wind blown out of the above outlet port, the comfortable air present on the front-seat side can be circulated to the rear area of the vehicle.

EMBODIMENTS FOR EXPLOITATION OF THE INVENTION

Figure 1:
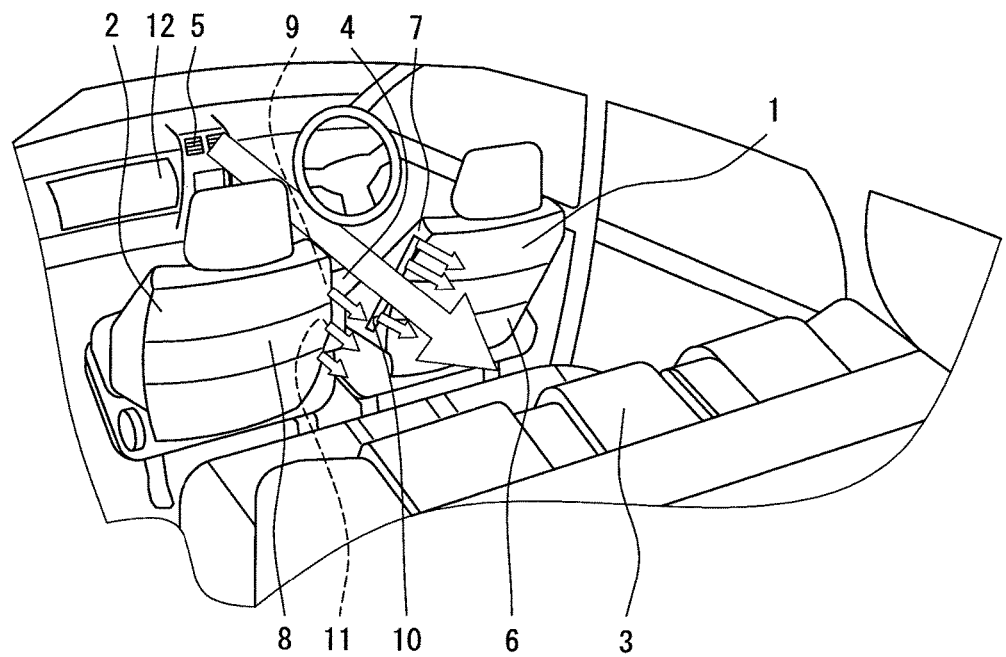
FIG. 1 is a perspective view illustrating a vehicle interior and an operation of a vehicular air-circulation promotion apparatus according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

The combinations of the parts are not limited to those specifically illustrated in each embodiment. Even when there is no description, the embodiments can also be used in partial combination as long as there is not a problem in combination.

First Embodiment

Hereinafter, a first embodiment of the present disclosure will be described in detail with reference to FIG. 1 to FIG. 8. FIG. 1 illustrates the operation of an air-circulation promotion apparatus for a vehicle. Referring to FIG. 1, a driver's seat 1 and a front passenger seat 2 are disposed in the vehicle as front side seats, and a rear side seat 3 is disposed as a rear seat. A gap 4 is present between the driver's seat 1 and the front passenger seat 2, and a face outlet port 5 of a vehicle air conditioner is so disposed as to be substantially opposed to the gap 4. The driver's seat 1 and the front passenger seat 2 may be used as an example of the seat disposed in the vehicle interior. The driver's seat 1 and the front passenger seat 2 may be symmetrical in structure.

Seat outlet ports (seat side outlet ports) 10 and 11 are provided in a side surface 7 of the front passenger seat side in a seat back 6 forming a backrest of the driver's seat 1, and a side surface 9 of the driver's seat side in a seat back 8 forming a backrest of the front passenger seat 2, respectively. The seat outlet ports 10 and 11 blow air, which has been sucked into the seats 1 and 2, rearward from the respective side surfaces 7 and 9 of the seat backs 6 and 8. Wind blown out of the seat outlet ports 10 and 11 enables air present between the face outlet port 5 and the seats 1, 2 to flow to a rear area of the vehicle. This makes it possible to circulate a comfortable air toward a rear side of the seat to create a vehicle interior environment where there is no air retention.

A dashboard 12 disposed in front of the driver's seat is equipped with the face outlet port 5 for blowing conditioned air of the vehicle air conditioner. When the conditioned air obtained by operating the vehicle air conditioner is blown out of the face outlet port 5 toward the rear seat, the air may be blown out of the seat outlet ports 10 and 11 along a flow of the conditioned air. To achieve this, when a blowing mode of the vehicle air conditioner is set to be a face blowing mode for blowing air in a direction toward a face of an occupant, seat air conditioning fans in the seats 1 and 2 may be only operated to be rotated simultaneously. With this configuration, the conditioned air from the face outlet port 5 can be conveyed to the rear area of the vehicle by the aid of the wind blown out of the seat outlet ports 10 and 11. The seat air conditioning fan is an example of circulation fans.

The face outlet port 5 is an example of the center vent outlet port for blowing air toward between the driver's seat 1 and the front passenger seat 2, and the seat outlet ports 10 and 11 are formed opposite to each other between the face outlet port 5 and the rear side seat 3. Therefore, the air can be blown out of the seat outlet ports 10 and 11 so as to assist the wind traveling from the face outlet port 5 to the rear area of the vehicle. The seat outlet ports 10 and 11 face a flow path of the wind blown out of the face outlet port 5.

Figure 2:
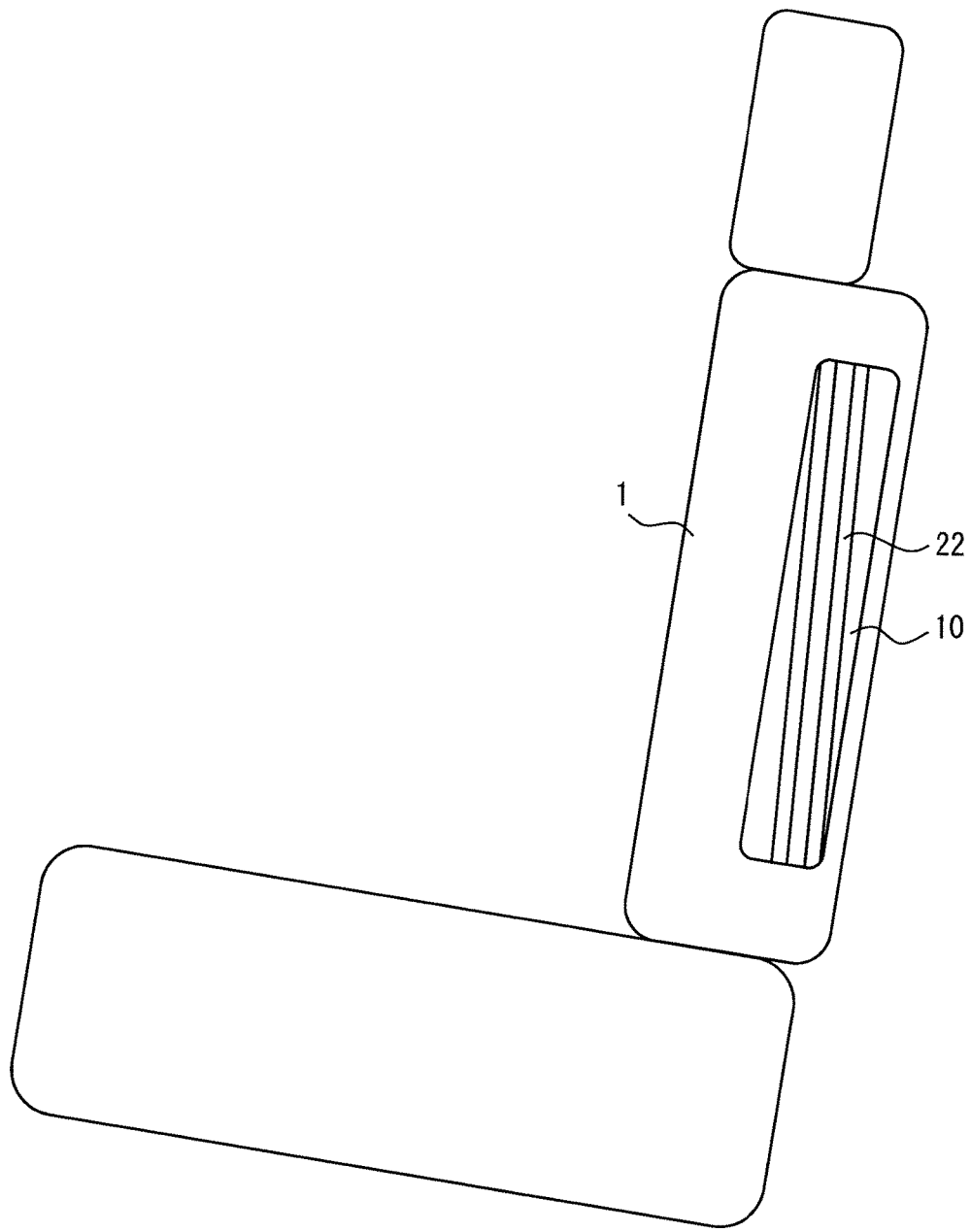
FIG. 2 is a side view of a driver's seat according to the first embodiment.
Figure 3:
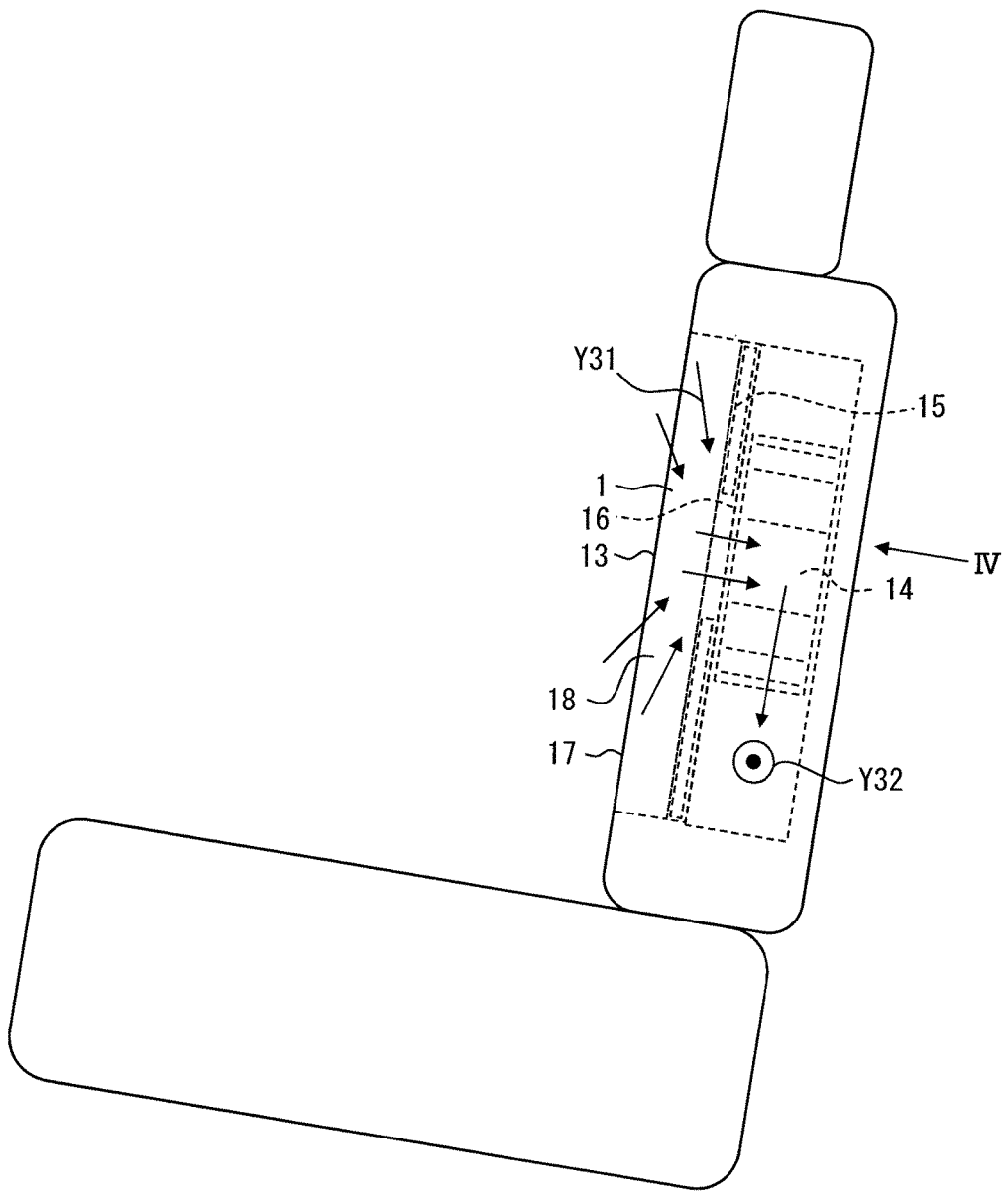
FIG. 3 is an internal configuration view of the seat of FIG. 2, according to the first embodiment.
Figure 4:
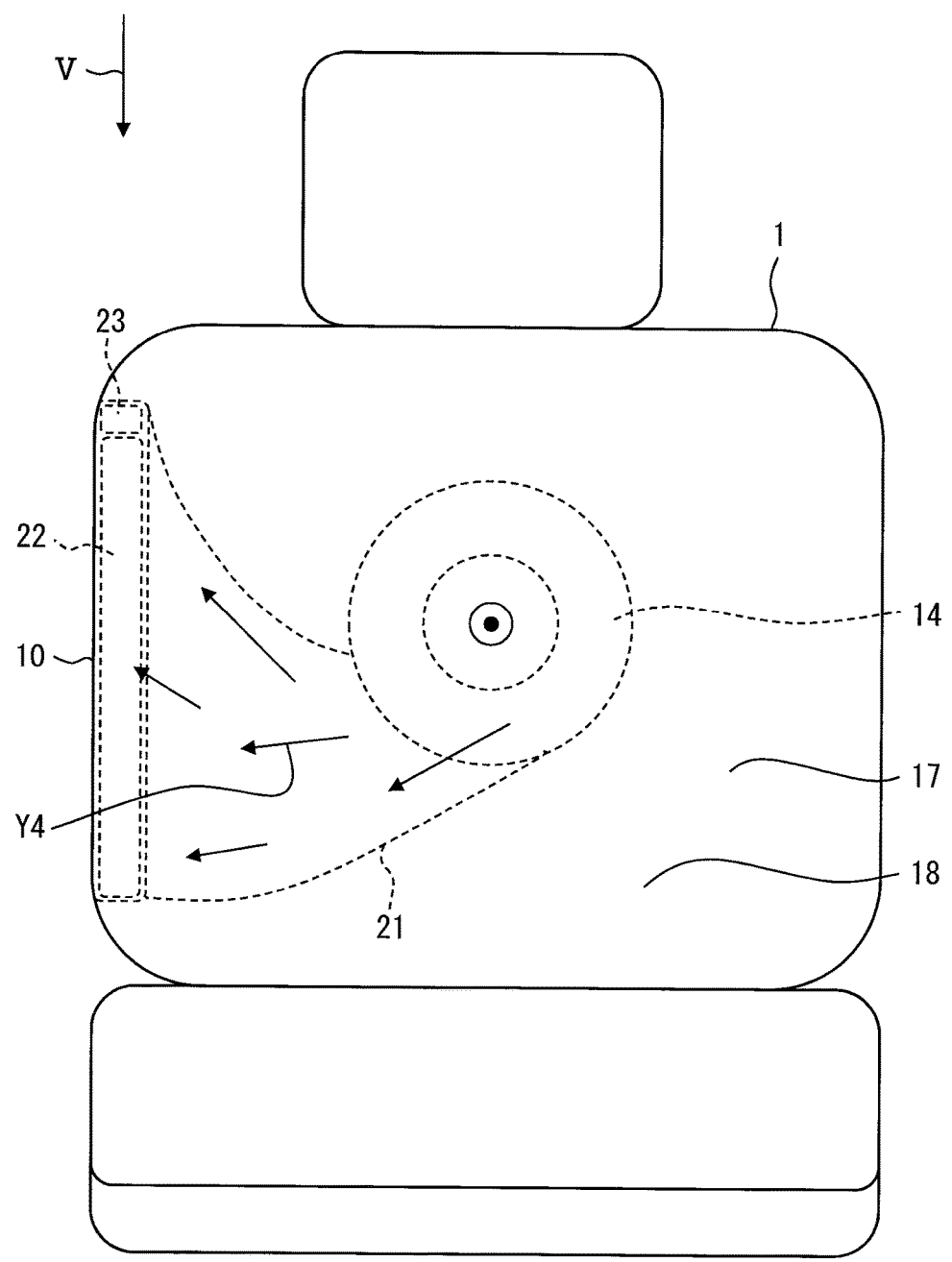
FIG. 4 is an internal configuration view of the driver's seat viewed from a direction of an arrow IV in FIG. 3, according to the first embodiment.

FIG. 2 illustrates the driver's seat 1 of FIG. 1. FIG. 3 illustrates an internal configuration of the driver's seat 1 of FIG. 2. Further, FIG. 4 illustrates an internal configuration viewed from a back surface of the driver's seat 1. As illustrated in FIGS. 3 and 4, the driver's seat 1 (the same is applied to the front passenger seat 2) is internally equipped with an inlet port 13 (formed of a porous seat skin) that sucks the air from an outside of the seat, and a circulation fan 14 that blows the sucked air to the outside of the seat through the seat outlet port 10.

Referring to FIG. 3, the circulation fan 14 formed of centrifugal multi-blade fan is fitted to a partition wall 15 disposed in the seat 1, and a through-hole 16 is formed in the partition wall 15. Air is introduced into the circulation fan 14 from a seat surface side that comes in contact with the occupant through a porous skin 17 of the seat 1 and an elastic member (cushion member) 18 as indicated by plural arrows Y31 in FIG. 3, and the air flows to a near side Y32 of a paper plane in FIG. 3, that is, in a direction of arrows Y4 of FIG. 4 due to a centrifugal force.

A seat internal duct 21 is formed in the seat 1, and air is more likely to flow in the seat internal duct 21 than an outside of the seat internal duct 21. Plural louver parts of a seat side louver 22 are rotatably disposed on a seat outlet port side of the seat internal duct 21. The rotation of the seat side louver 22 is controlled by a small motor or an electromagnetic solenoid which configures a louver drive device 23. The seat side louver 22 is an example of the seat louver.

Figure 5:
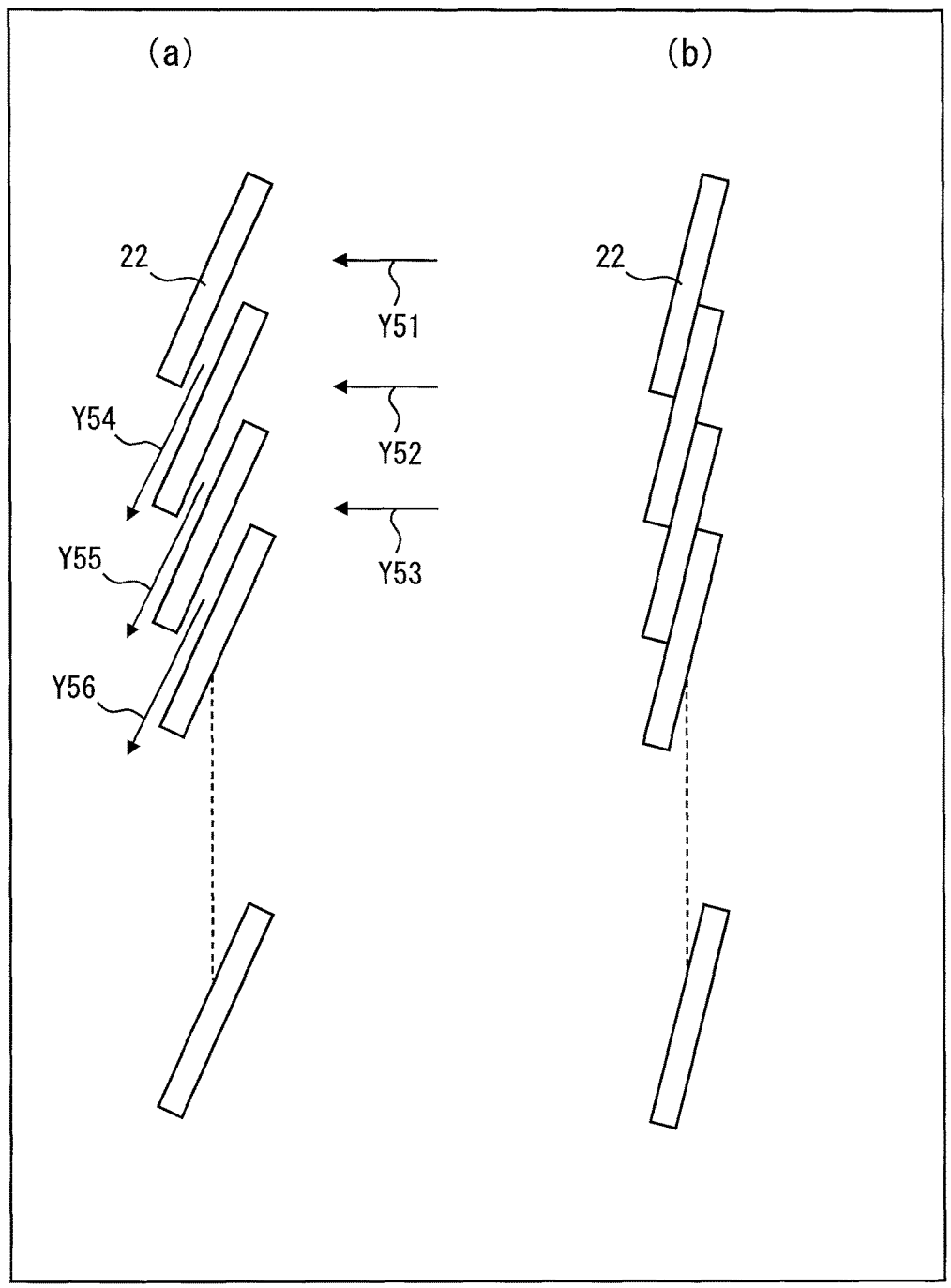
FIG. 5 is a schematic diagram illustrating motion of a seat side louver viewed from a direction of an arrow V in FIG. 4, according to the first embodiment.

FIG. 5 illustrates the shape of the plural louver parts viewed from a direction of an arrow V in FIG. 4. FIG. 5 (a) shows a state in which the seat side louver 22 is opened. In this state, a blowing wind of the circulation fan 14 which flows from the arrow Y4 in FIG. 4, that is, directions of arrows Y51, Y52, and Y53 in FIG. 5 is blown diagonally toward the rear of the seat as indicated by directions of arrows Y54, Y55, and Y56 with a change of a flow of the wind by the seat side louver 22.

The front side seats 1 and 2 include the driver's seat 1 and the front passenger seat 2. The seat outlet port 10 of the driver's seat 1 and the seat outlet port 11 (FIG. 1) of the front passenger seat 2 are disposed opposite to the side surfaces 7 and 9 of the seat backs 6 and 8 of the driver's seat 1 and the front passenger seat 2, respectively. Therefore, the seat outlet port 10 and the seat outlet port 11 send air present around the side surfaces 7 and 9 of the respective seat backs 6 and 8 rearward.

The seat side louver 22 (FIG. 5) that controls the direction of the wind blown out of the seat outlet ports 10 and 11 is disposed in each of the seat outlet ports 10 and 11. The motion of the seat side louver 22 is controlled by an air conditioning control unit (air conditioning ECU) having a control unit of a seat air conditioner in the dashboard 12 in FIG. 1. Therefore, the opening and closing operation of the seat side louver 22 can be synchronized with timing at which the conditioned air is blown out of the face outlet port 5 of the vehicle air conditioner.

Figure 6:
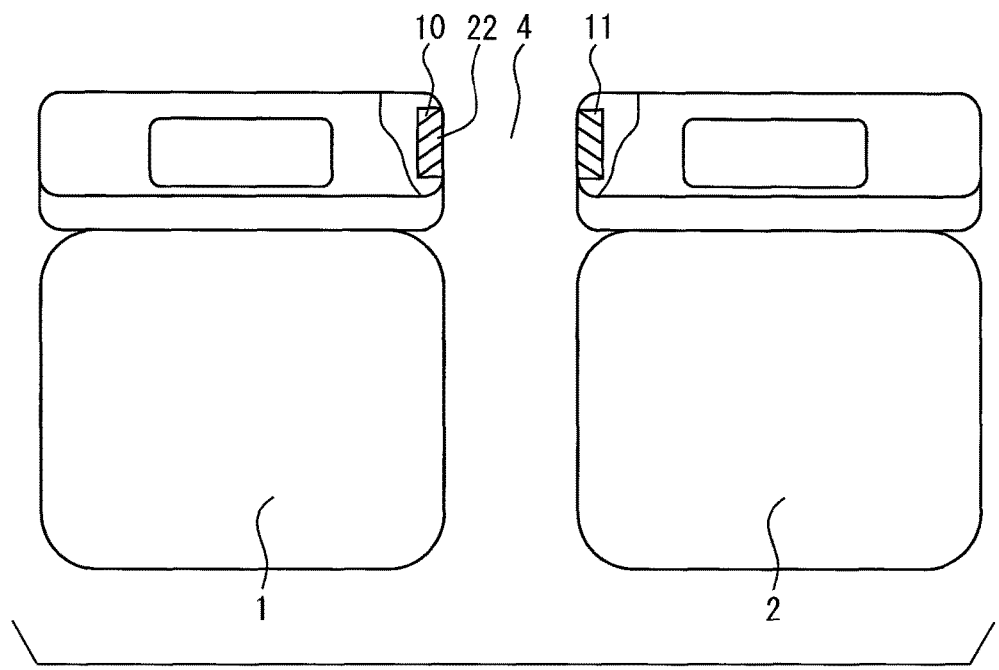
FIG. 6 is a schematic diagram of front side seats viewed from a ceiling side of a vehicle, according to the first embodiment.

In FIG. 6 illustrating portions of the seat outlet ports 10 and 11 of the seats 1 and 2 with partially broken parts, the driver's seat 1 and the front passenger seat 2 are juxtaposed to each other, and the gap 4 is provided between those seats. The seat outlet ports 10 and 11 are so disposed as to sandwich the gap 4 therebetween, and the seat side louver 22 schematically illustrated is disposed in each of the seat outlet ports 10 and 11. The seat side louvers 22 are disposed at positions visible from the outside.

Figure 7:
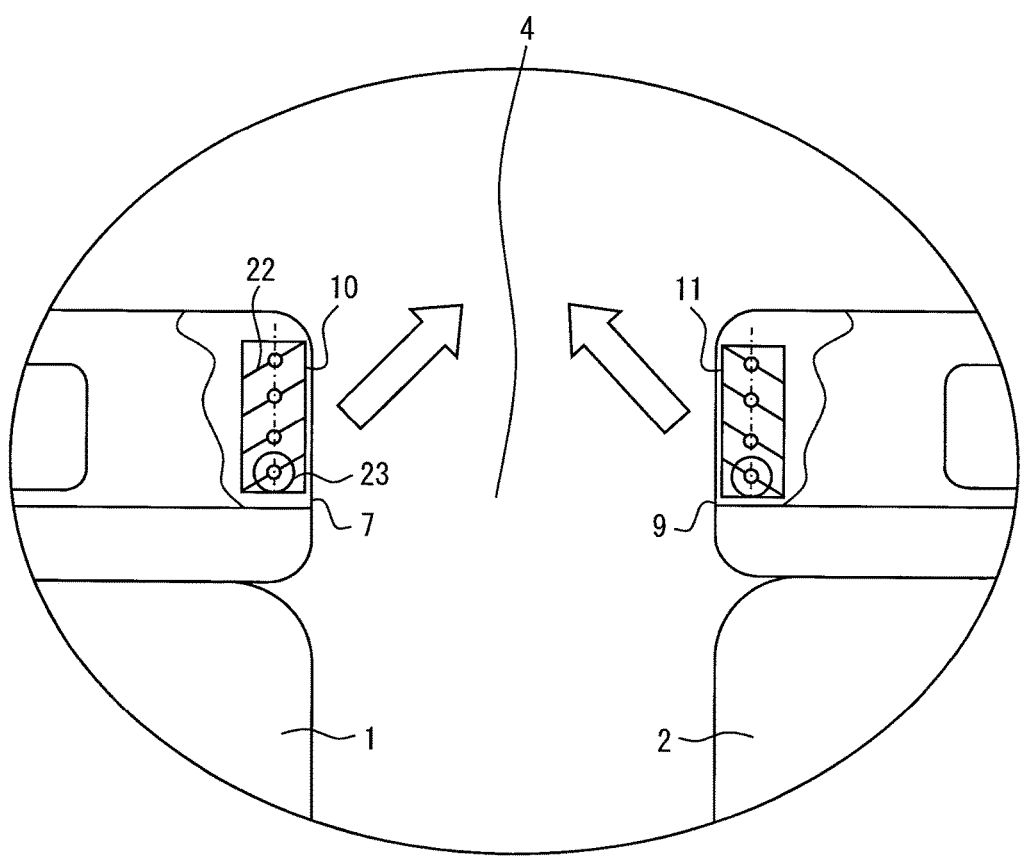
FIG. 7 is a partially enlarged view schematically illustrating an internal configuration of the seat side louver in FIG. 6 and a blown wind.

FIG. 7 schematically illustrates an internal configuration and a blowing wind of the seat side louver 22. In FIG. 7, the seat side louver 22 has the plural louver parts, and is configured so that each of the louver parts rotates about an axis, and the respective axes are operated in conjunction with each other through power transmission means (gears) not shown. One of those axes is connected with the louver drive device 23 incorporating a small motor therein to enable the opening and closing operation of the seat side louver 22. The left and right seat outlet ports 10 and 11 in FIG. 7 are each equipped with the seat side louver 22 of the same structure.

When the air flow is blocked or significantly inhibited by the louver drive device 23 as illustrated in FIG. 5(*b*), there is air that has nowhere to go while being pumped by the circulation fan (seat air conditioning fan) 14 in FIG. 4. The air leaks to the surface side of the seat 1 from the seat internal duct 21 through the porous elastic member 18 and the seat skin 17. Therefore, the seat side louver 22 and the louver drive device 23 are an example of an air flow switching device.

Figure 8:
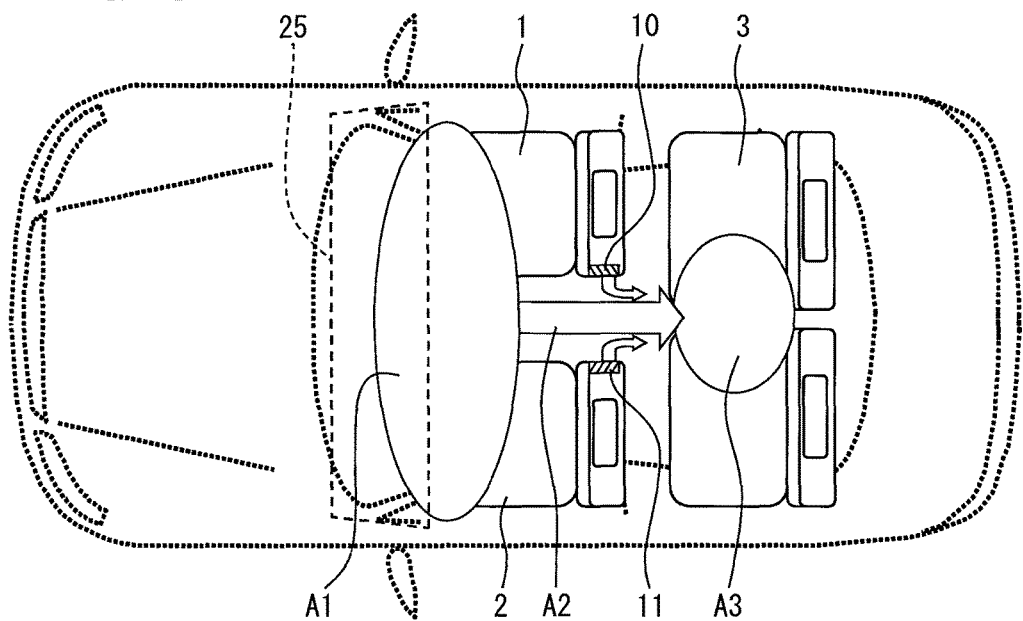
FIG. 8 is a schematic diagram illustrating a state in which a comfortable air present in a front area of the vehicle is circulated by the vehicular air-circulation promotion apparatus according to the first embodiment.

In other words, as illustrated in FIGS. 7 and 8, the front side seats 1 and 2 are equipped with an air flow switching device that switches the air flow from an air inlet port portion of the seat skin 17 to either an air flow blown out of an air outlet port portion of the seat skin 17 or an air flow blown out of the seat outlet ports 10 and 11. The air flow switching device switches the air flow from the circulation fan 14 to either the air flow blown out through each seat skin 17 of the seats 1, 2 or the air flow blown out through the seat outlet ports 10, 11.

The seat side louver 22 and the louver drive device 23 may be used as the air flow switching device. Therefore, the occupant seated in each of the seat 1 and 2 is comforted by ventilation of the seat skin 17. At the same time, as illustrated in FIG. 8, a comfortable air A1 present in the front area of the vehicle flows to the rear area of the vehicle as a circulating air A2, and a comfortable vehicle interior environment having no air retention can be created as an air A3 that has reached the rear area of the vehicle.

Figure 9:
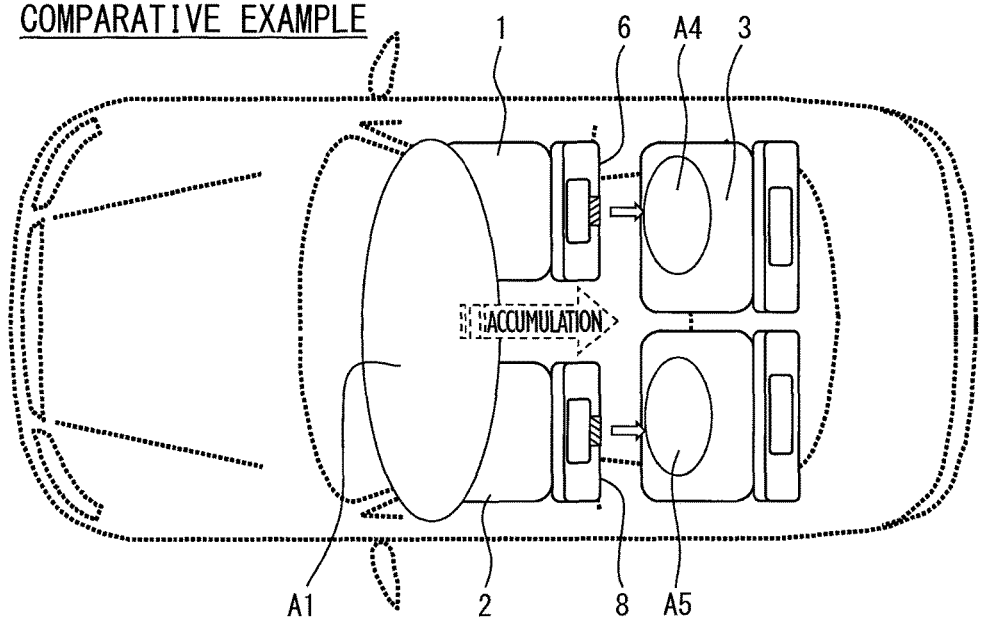
FIG. 9 is a schematic diagram illustrating a state of air in a vehicle having a seat air conditioner according to a comparative example.

FIG. 9 illustrates a comparative example. In the comparative example, since exhaust airs A4 and A5 of the seat air conditioning are blown behind a center of the seat backs 6 and 8, the exhaust airs A4 and A5 are hit directly to the occupant in the rear seat, or the relatively comfortable air A1 on the front seat side remains.

Hereinafter, effects of the first embodiment will be described. In the first embodiment, the seats 1 and 2 are provided in the vehicle, and the seat outlet ports 10 and 11 are provided in the seats 1 and 2. The seat outlet ports 10 and 11 draw air in the front area of the vehicle and produce an air flow toward the rear area of the vehicle by blowing air to the rear area of the vehicle or diagonally toward the rear area of the vehicle. The seat outlet ports 10 and 11 are disposed on the side surfaces 7 and 9 extending in the front-rear direction of the vehicle, and the seat outlet ports 10 and 11 blow air so as to draw thereinto air in the front area of the vehicle. The seat outlet ports 10 and 11 blow the air at an angle of the drawing of the air in the front area of the vehicle.

According to the above configuration, since the air flow toward the rear area of the vehicle can be produced with the use of viscosity of the air blown out of the seat outlet ports 10 and 11, the air travels from the front area of the vehicle toward the rear area of the vehicle along the air flow. This allows comfortable air to be conveyed to the rear area of the vehicle, and the comfort of the vehicle interior can be improved.

The seat outlet ports 10 and 11 blow the sucked air from the respective side surfaces 7 and 9 of the seat backs 6 and 8 toward the rear area of the vehicle or diagonally toward the rear area of the vehicle. According to the above configuration, since the air flow toward the rear area of the vehicle is efficiently produced with the air blown out of the seat outlet ports 10 and 11, the air travels from the front area of the vehicle toward the rear area of the vehicle along the air flow. This allows comfortable air to be conveyed to the rear area of the vehicle, and the comfort of the vehicle interior can be improved.

The face outlet port 5 of a vehicle air conditioner 25 disposed in front of the seats 1 and 2 is provided. The seat outlet ports 10 and 11 that blow the sucked air from the side surfaces 7 and 9 of the seat backs 6 and 8 forming back rests of the seats 1 and 2 to the rear area of the vehicle are disposed in the seats 1 and 2, respectively. Further, the air present from the face outlet port 5 to the seats 1 and 2 flows toward the rear of the seats 1 and 2 by the aid of wind that blows from the seat outlet ports 10 and 11.

According to the above configuration, the air present from the face outlet port 5 to the seats 1 and 2 can flow toward the rear of the seats 1 and 2 by the aid of wind that blows from the seat outlet ports 10 and 11. Hence, the comfortable air can be circulated toward the rear side of the seat to create the vehicle interior environment where there is no air retention.

Also, a control unit 32 is provided and controls the seat outlet ports 10 and 11 to blow wind when the conditioned air is blown out of the face outlet port 5 toward the rear area of the vehicle in operation of the vehicle air conditioner 25. According to the above configuration, the conditioned air from the face outlet port 5 can be conveyed to the rear area of the vehicle due to the wind blown out of the seat outlet ports 10 and 11.

Further, the inlet port 13 that sucks the air from the outside of the seats, and the circulation fan 14 that blows the sucked air through the seat outlet ports 10 and 11 are provided. According to this configuration, a circulation state of the air toward the rear area of the vehicle can be obtained by the air pumping action of the circulation fan 14.

In addition, the seat side louver 22 that controls the direction of the wind blown out of the seat outlet ports 10 and 11 is disposed in each of the seat outlet ports 10 and 11. Therefore, wind that travels from the side of the seats 1 and 2 to the rear area of the vehicle can be created by the seat side louver 22.

Then, the seats 1 and 2 include the driver's seat 1 and the front passenger seat 2. The seat outlet port 10 of the driver's seat 1 and the seat outlet port 11 of the front passenger seat 2 are disposed opposite to the side surfaces 7 and 9 of the seat backs 6 and 8 of the driver's seat 1 and the front passenger seat 2, respectively. According to this configuration, air present around the side surfaces 7 and 9 of the respective seat backs 6 and 8 can be easily sent toward the rear area of the vehicle.

Further, the face outlet port 5 is an example of a center vent outlet port for blowing air toward between the driver's seat 1 and the front passenger seat 2. The seat outlet ports 10 and 11 are formed between the face outlet port 5 and the rear area of the vehicle. Therefore, the air can be blown out of the seat outlet ports 10 and 11 so as to assist the wind traveling from the face outlet port 5 to the rear area of the vehicle.

Further, the circulation fan 14 is incorporated into the seats 1 and 2, and used as a seat internal fan. Also, the air flow switching device is provided for switching the air flow from the air inlet port of the circulation fan 14 to either the air flow blown out through each seat skin 17 of the seats 1 and 2 or the air flow blown out through the seat outlet ports 10 and 11.

According to the above configuration, the occupant seated in the seat can be comforted with the air that passes through each seat skin 17 of the seats 1 and 2. Also, the comfort air present in the front area of the vehicle can be supplied to the rear area of the vehicle as occasion demands, thereby making it possible to create the comfortable vehicle interior environment having no air retention.

Second Embodiment

Then, a second embodiment of the present disclosure will be described. In the following respective embodiments, the same components as those in the above-mentioned first embodiment are denoted by identical reference numerals, and will be omitted from a description, and different configurations will be described. Incidentally, in the second and subsequent embodiments, the same reference numerals as those in the first embodiment denote identical configurations, and a preceding description is incorporated.

Figure 10:
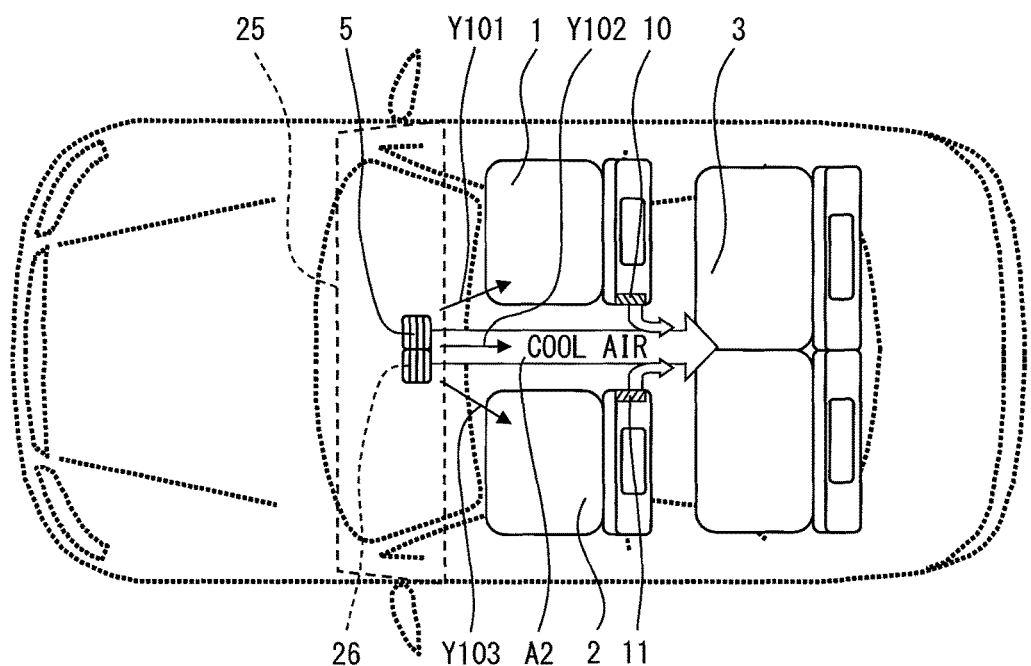
FIG. 10 is a schematic diagram illustrating a vehicle having a swing louver in a face outlet port of a vehicle air conditioner according to a second embodiment of the present disclosure.
Figure 11:
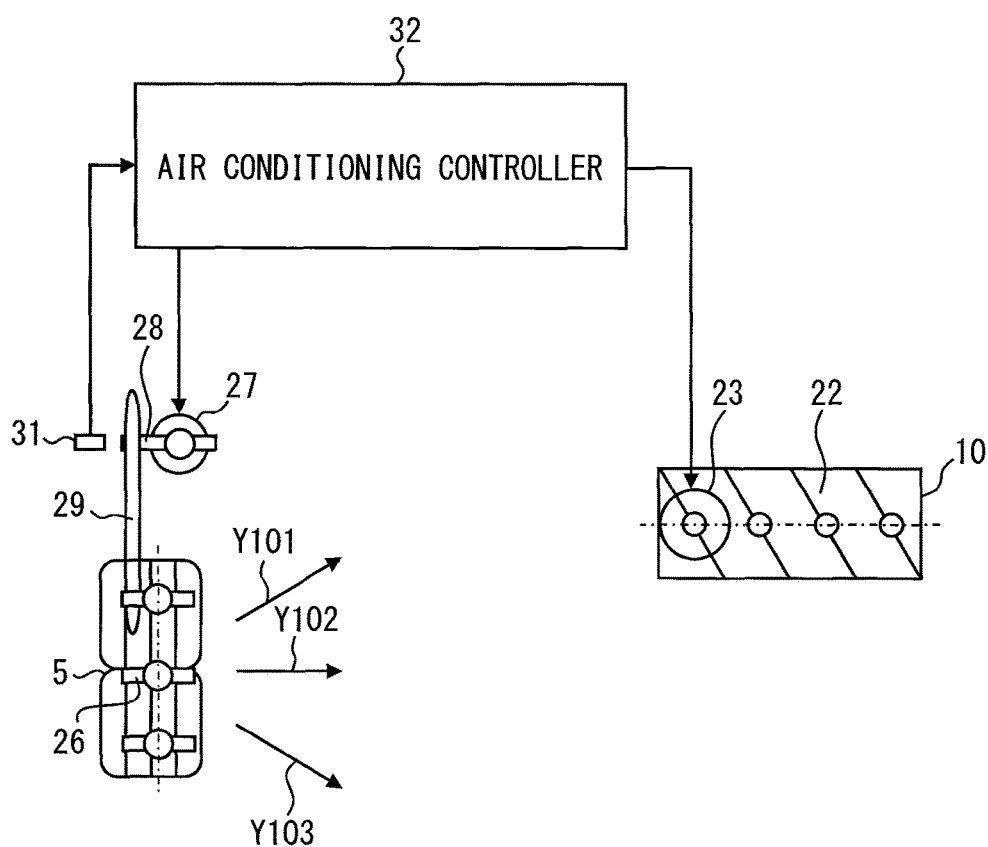
FIG. 11 is a schematic diagram illustrating an electric cooperative system between the swing louver illustrated in FIG. 10 and a louver drive device that drives a seat side louver.

Referring to FIG. 10, a swing louver 26 (FIG. 11) is provided in the face outlet port 5 of the vehicle air conditioner 25. Referring to FIG. 11, an electric cooperative system of the swing louver 26 and the louver drive device 23 that drives the seat side louver 22 will be described.

Referring to FIGS. 10 and 11, the swing louver 26 is disposed within the face outlet port 5 in the vehicle air conditioner 25. Blowing wind swings from side to side as indicated by arrows Y101, Y102, and Y103 due to the right and left swing of the swing louver 26.

The motion of the swing louver 26 is provoked by a drive motor 27, and crank mechanisms 28 and 29 in FIG. 11 for driving the swing louver 26. The crank mechanisms 28 and 29 include the lever 28 that rotates by the drive motor 27, and the rod 29 that is coupled with the lever 28 by a pin and reciprocates. A magnetic sensor (micro switch) 31 that detects the motion of the crank mechanisms 28 and 29 can monitor timing at which the swing louver 26 blows wind straight in a rear seat direction indicated by the arrow Y102 in FIG. 10. The magnetic sensor 31 may be used as an example of a sensor for detecting the motion of the swing louver 26.

The air conditioning control unit 32 grasps the timing at which the swing louver 26 blows the wind straight in the rear seat direction indicated by the arrow Y102 according to a signal from the magnetic sensor 31, and controls the rotation of the small motor of the louver drive device 23. As a result, wind is blown rearward from the seat side louvers 22 within the seat outlet port 10 (11) in conjunction with the motion of the swing louvers 26. This makes it possible to blow the wind from the seat outlet port 10 (11) rearward in conjunction with the comfortable air blown out of the face outlet port 5 so that the comfortable air can travel toward the rear area of the vehicle.

Hereinafter, effects of the second embodiment will be described. The second embodiment is equipped with an electric cooperative system that has the swing louver 26 disposed in the face outlet port 5, and controls the louver drive device 23 arranged on each side of the seats 1 and 2 in conjunction with the motion of the swing louver 26. Therefore, the wind is blown out of the seat outlet port 10 (11) rearward in conjunction with the motion of the swing louver 26. This makes it possible to blow the wind from the seat outlet port 10 (11) rearward at timing at which the comfortable air is blown out of the face outlet port 5 so that the comfortable air is directed toward the rear area of the vehicle.

A position of the swing louver 26 at timing when the swing louver 26 blows wind straight toward the rear area of the vehicle as indicated by the arrow Y102 in FIG. 10 is detected by the magnetic sensor 31 for detecting the position of the lever 28 of the crank mechanisms 28 and 29 that reciprocate. A detected position signal is input to the air conditioning control unit 32 from the magnetic sensor 31.

The air conditioning control unit 32 energizes the motor (or electromagnetic solenoid) in the louver drive device 23 to control the motion of the seat side louver 22 on the basis of the signal of the magnetic sensor 31. The seat side louver 22 blows wind diagonally rearward from the seat outlet port 10 (11) as illustrated in FIG. 5(*a*), at timing at which the swing louver 26 blows the wind straightly toward the rear area of the vehicle as indicated by the arrow Y102 in FIG. 10.

Moreover, the above control is performed when the operation mode of the vehicle air conditioner 25 is mainly a face mode for blowing air from the face outlet port 5. In other words, the wind is blown diagonally rearward from the seat outlet port 10 (11) on condition that the operation mode is the face mode. As a result, since the wind is blown out of the seat outlet port 10 (11) when the conditioned air flows toward a face direction of the occupant, the wind blown out of the seat outlet port 10 (11) where the conditioned air cannot be effectively circulated can be eliminated as much as possible. That is, the efficiency when the conditioned air is circulated can be improved.

Third Embodiment

Figure 12:
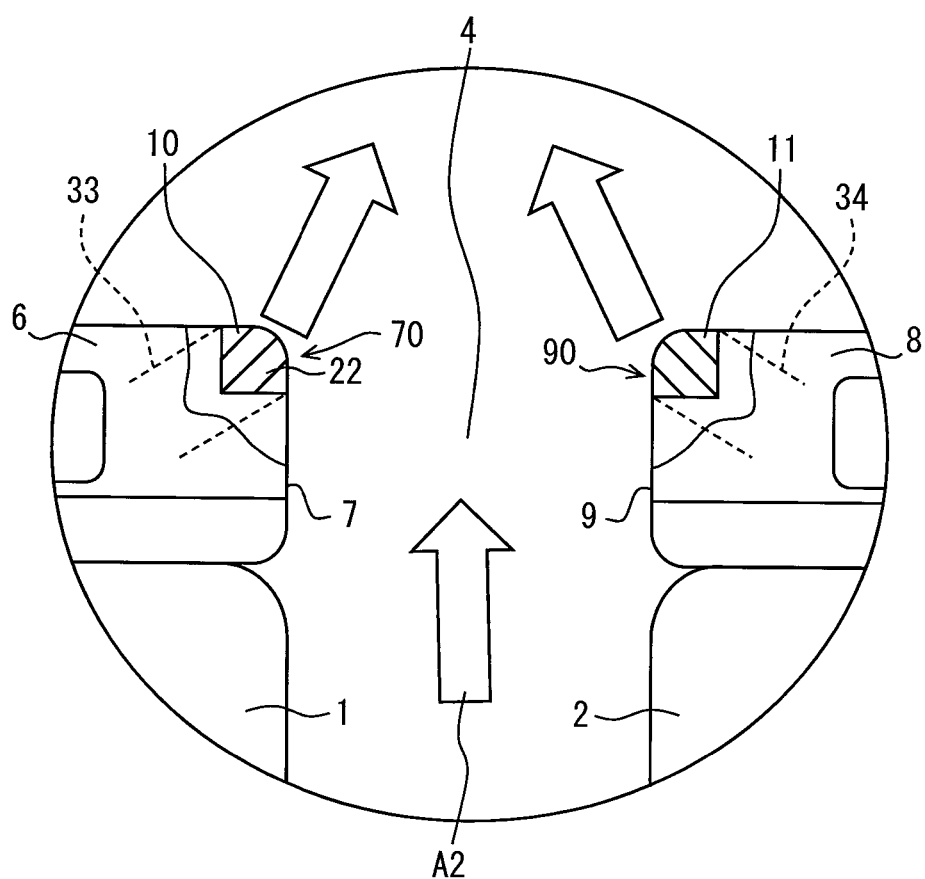
FIG. 12 is a partially enlarged view schematically illustrating an internal configuration of a seat and a blown wind, according to a third embodiment of the present disclosure.

Subsequently a third embodiment of the present disclosure will be described. Portions different from those in the above embodiments will be described. Referring to FIG. 12, the seat outlet ports 10 and 11 are connected with seat internal ducts 33 and 34 inclined diagonally rearward, respectively. A direction of the wind blown out of each of the seat internal ducts 33 and 34 is set to be directed diagonally rearward. According to this configuration, since the seat outlet ports 10 (11) are connected with the seat internal ducts 33 and 34 inclined diagonally rearward, the wind can be blown rearward from the seat internal ducts 33 and 34. That is, since the seat outlet ports 10 and 11 are disposed in rear corner portions 70 and 90 of the side surfaces 7 and 9 of the seat backs 6 and 8 of the seats 1 and 2, respectively, wind can be blown out of the rear corner portions 70 and 90 rearward in the vehicle interior. The rear corner portions 70 and 90 may be used as an example of corner portions (curving corners) of the seats 1 and 2.

In the third embodiment, the seat outlet ports 10 and 11 are disposed in the rear corner portions 70 and 90 of the side surfaces 7 and 9 of the seat backs 6 and 8 of the seats 1 and 2, respectively. According to this configuration, wind is blown diagonally rearward from the rear corner portions 70 and 90, and air present within the gap 4 (between the side surfaces 7 and 9 of the seat backs 6 and 8) can be sent toward the rear area of the vehicle as indicated by the arrow A2. The seat side louver 22 may be omitted, and not movable but fixed.

Hereinafter, effects of the third embodiment will be described. In the third embodiment, the seats 1 and 2 are provided in the vehicle, and the seat outlet ports 10 and 11 are provided in the seats 1 and 2. The seat outlet ports 10 and 11 draw thereinto air in the front area of the vehicle and produce an air flow toward the rear area of the vehicle by blowing air diagonally toward the rear area of the vehicle. The seat outlet ports 10 and 11 are disposed in the corner portions (curving corners) of the seats, and blow air at an angle of the drawing of the air in the front area of the vehicle. With the above configuration, the air in the front area of the vehicle can be involved in the blown air and conveyed to the rear area of the vehicle.

Specifically, the seat outlet ports 10 and 11 are disposed in the corner portions (curving corners) of the seat backs 6 and 8 forming the back rests of the seats 1 and 2, and the seat outlet ports 10 and 11 blow air diagonally toward the rear area of the vehicle, respectively.

Fourth Embodiment

Figure 13:
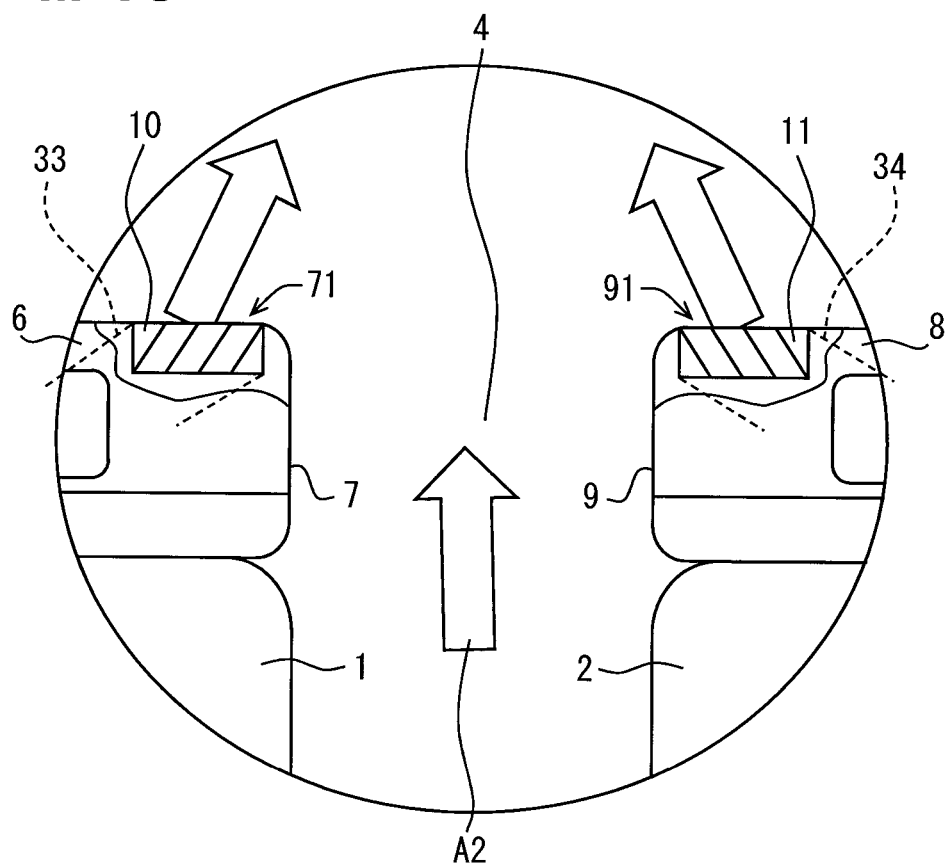
FIG. 13 is a partially enlarged view schematically illustrating an internal configuration of a seat and a blown wind, according to a fourth embodiment of the present disclosure.

Subsequently, a fourth embodiment of the present disclosure will be described. Portions different from those in the above embodiments will be described. Referring to FIG. 13, the seat outlet ports 10 and 11 are connected with the seat internal ducts 33 and 34 inclined diagonally rearward, and a direction of the wind blown out of each of the seat internal ducts 33 and 34 is set to be directed diagonally rearward. According to this configuration, since the seat outlet ports are connected with the seat internal ducts 33 and 34 inclined diagonally rearward, the wind can be blown rearward from the seat internal ducts.

Also, the seat outlet ports 10 and 11 are disposed in side corner portions 71 and 91 of surfaces of the rear sides of the seat backs 6 and 8 of the seats 1 and 2, respectively. Therefore, the seat outlet ports 10 and 11 can send air present within the gap 4 between the respective side surfaces 7 and 9 of the seat backs 6 and 8 rearward as indicated by the arrow A2. The side corner portions 71 and 91 may be used as an example of the corner portions (curving corners) of the seats 1 and 2.

Hereinafter, effects of the fourth embodiment will be described. In the fourth embodiment, the seats 1 and 2 are provided in the vehicle, and the seat outlet ports 10 and 11 are provided in the seats 1 and 2. The seat outlet ports 10 and 11 draw air in the front area of the vehicle and produce an air flow toward the rear area of the vehicle by blowing air diagonally toward the rear area of the vehicle. The seat outlet ports 10 and 11 are disposed in the corner portions of the seats, and blow air at an angle of the drawing of air in the front area of the vehicle. With the above configuration, the air in the front area of the vehicle can be involved in the blown air and conveyed to the rear area of the vehicle.

Specifically, the seat outlet ports 10 and 11 are disposed in the corner portions of the seat backs 6 and 8 forming the back rests of the seats 1 and 2, and the seat outlet ports 10 and 11 blow air diagonally toward the rear area of the vehicle and toward the outside of the seats, respectively. With the above configuration, the air in the front area of the vehicle can be effectively involved in the blown air and transferred to the rear area of the vehicle.

Fifth Embodiment

Figure 14:
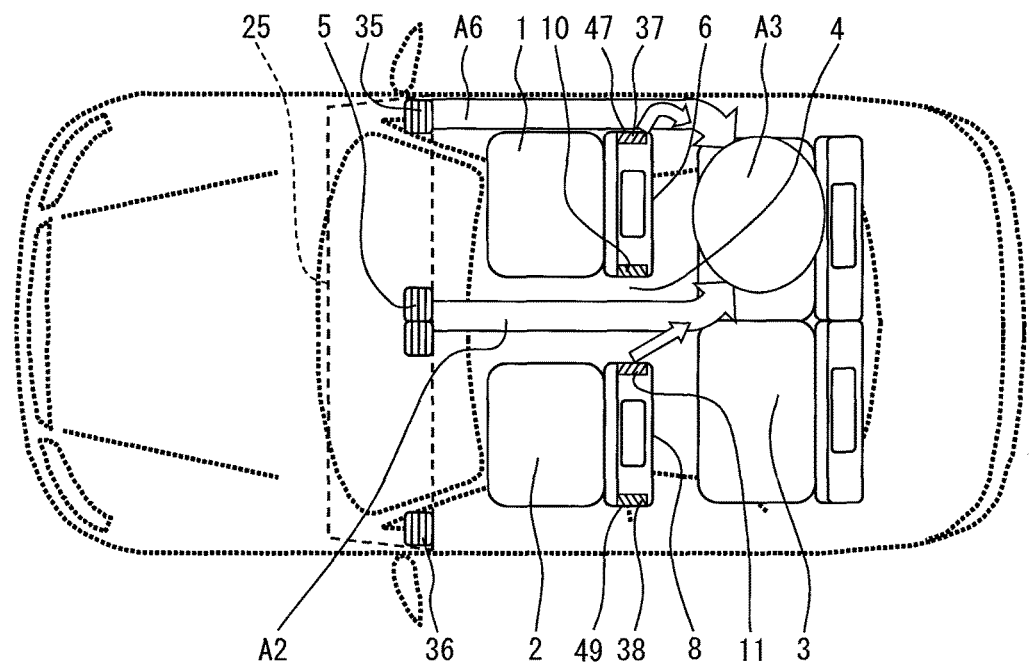
FIG. 14 is a schematic view illustrating a vehicle having a vehicular air-circulation promotion apparatus according to a fifth embodiment of the present disclosure.

Subsequently, a fifth embodiment of the present disclosure will be described. Portions different from those in the above embodiments will be described. Referring to FIG. 14, a vehicular air-circulation promotion apparatus for guiding air from side vent outlet ports 35 and 36 of the vehicle air conditioner 25 to the rear is provided. The vehicle air conditioner 25 includes the side vent outlet ports 35 and 36 that blow the air to the right and left sides of the vehicle, respectively. Window side seat outlet ports 37 and 38, which blow air from window-side side surfaces 47 and 49 of the seat backs 6 and 8 rearward, blow wind for assisting a wind A6 blown rearward from the side vent outlet ports 35 and 36, respectively. In other words, the window side seat outlet ports 37 and 38 are vehicle side seat outlet ports disposed in the side surfaces 47 and 49 of the seats 1 and 2 which are close to the sides of the vehicle, respectively.

The window side seat outlet ports 37 and 38 are disposed in the front side seats 1 and 2 and blow the air, which has been sucked through the seat skins and the like, rearward from the window-side side surfaces 47 and 49 of the seat backs 6 and 8, respectively. Each of the window side seat outlet ports 37 and 38 is provided between the front side seat 1 or 2 and a lateral-surface window disposed on a right or left side of the vehicle. With this configuration, the window A6 blown rearward is excellently assisted.

According to the above configuration, the window side seat outlet ports 37 and 38, which blow the sucked air from the window-side side surfaces 47 and 49 of the seat backs 6 and 8 rearward, are disposed in the front side seats 1 and 2, respectively. The window side seat outlet ports 37 and 38 are an example of the seat outlet ports. The air blown out of the side vent outlet ports 35 and 36, and present around the front side seats can flow by the aid of the wind blown out of the window side seat outlet ports 37 and 38 toward the rear side seat (i.e. rearward in the vehicle interior) along the window. Hence, a vehicle interior environment that is satisfied by the occupant in the rear seat can be created by the aid of an air A3 that has reached the rear area of the vehicle with the circulation of the comfortable air present on the front seat side to the rear area of the vehicle.

Sixth Embodiment

Figure 15:
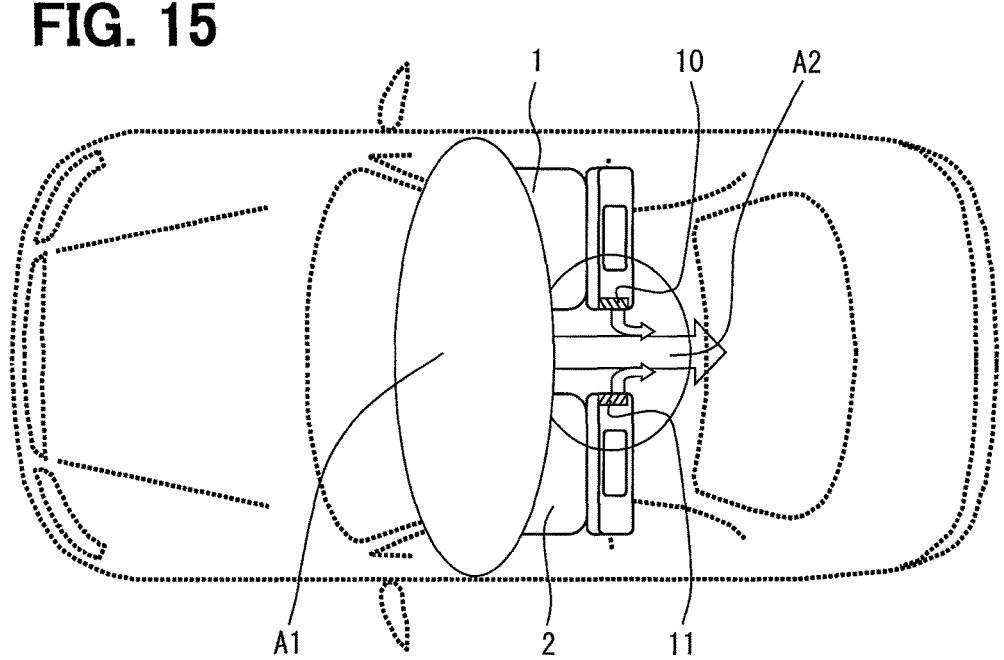
FIG. 15 is a schematic diagram illustrating a vehicle having no rear seat, according to a sixth embodiment of the present disclosure.

Subsequently, a sixth embodiment of the present disclosure will be described. Portions different from those in the above embodiments will be described. FIG. 15 schematically illustrates a vehicle called "two-seater". FIG. 15 illustrates a state in which the vehicular air-circulation promotion apparatus according to the present disclosure is installed in a vehicle having no rear seats (or vehicle assuming that no occupant is seated in the rear seat). In this case, although no occupant is present in the rear seat, the circulating wind A2 is created by the wind blown out of the seat outlet ports 10 and 11 to circulate the wind in the vehicle interior, thereby being capable of making the occupants seated in the seats 1 and 2 feel the travel of the comfortable air A1.

Seventh Embodiment

Figure 16:
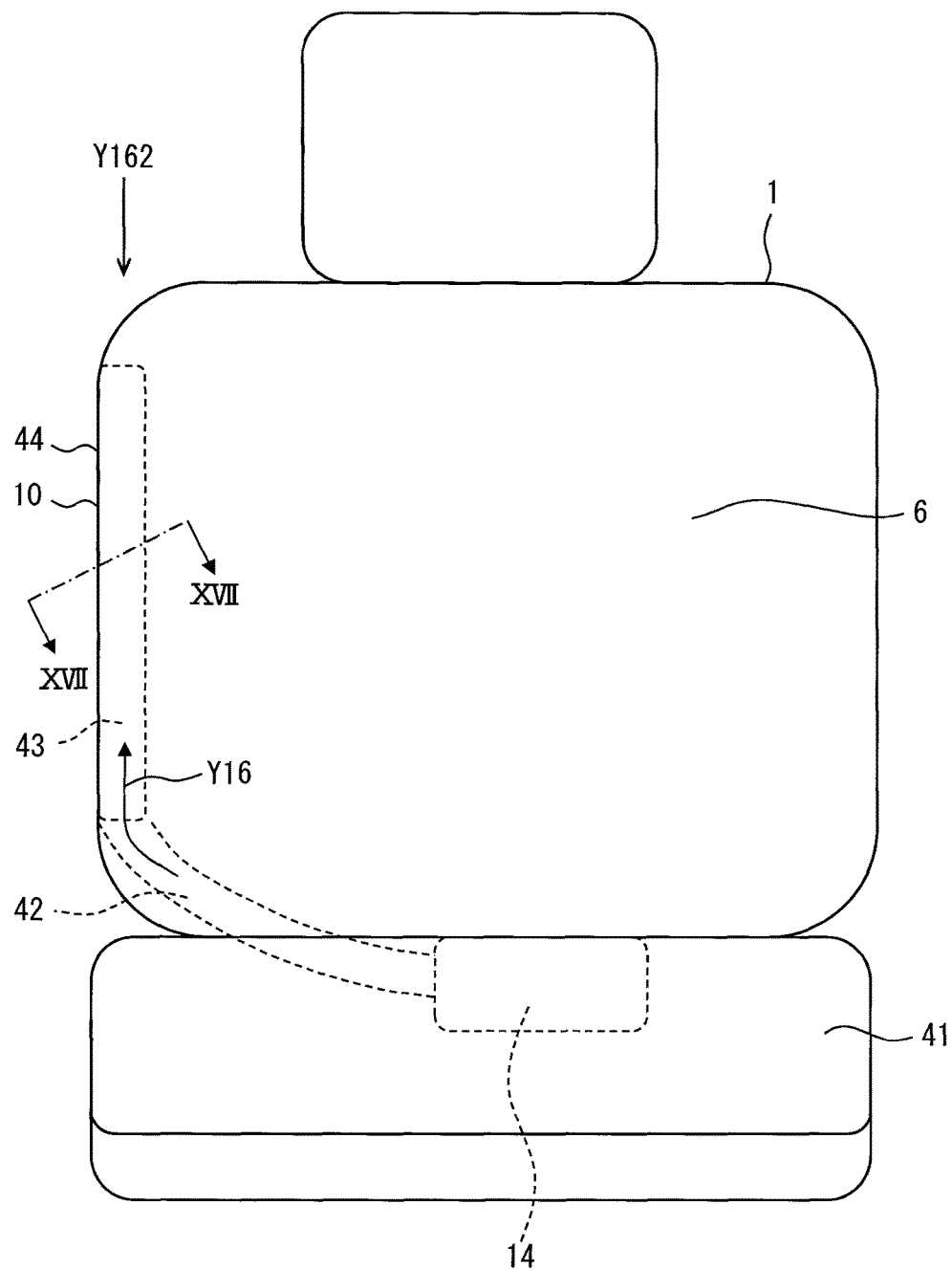
FIG. 16 is a schematic back view of a seat illustrating a state in which a driver's seat is viewed from a rear seat side, according to a seventh embodiment of the present disclosure.
Figure 17:
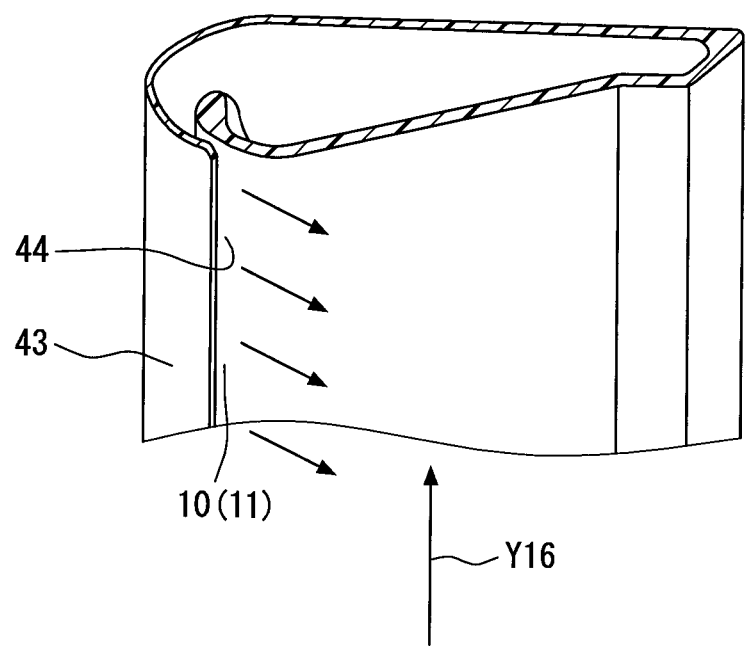
FIG. 17 is a perspective cross-sectional view of a spiral cylindrical portion taken along an arrow line XVII-XVII in FIG. 16.

Subsequently, a seventh embodiment of the present disclosure will be described. Portions different from those in the above embodiments will be described. FIG. 16 illustrates a state in which the back surface of the driver's seat 1 is viewed from the rear seat side. FIG. 17 illustrates a cross-section of a spiral cylindrical portion 43 along an arrow XVII-XVII line in FIG. 16. In FIG. 16, the seat internal fan forming the circulation fan 14 uses not a centrifugal fan but an axial fan. The axial fan is disposed not in the seat back 6, but in a seat cushion 41 under a seating portion of the seat 1. That is, the axial fan is disposed at a side closer to a floor. Also, the seat outlet port 10 (11) is equipped with no seat side louver.

In FIG. 16, air is fed into the spiral cylindrical portion 43 from the axial fan through a tube 42 as indicated by an arrow Y16. Air is blown diagonally rearward from the seat outlet port 10 (11) formed by a slit 44 disposed linearly on a side surface of the spiral cylindrical portion 43 in FIG. 17. In this way, the seventh embodiment uses a principle of a fan without blades which involves and blows a surrounding air due to wind blown out of the slit 44 used as the seat outlet port. Incidentally, it is effective that air swirling counter-clockwise when looking down from above in FIG. 16 as indicated by an arrow Y162 is fed as indicated by the arrow Y16. Also, the axial fan may be replaced with the centrifugal fan.

Eighth Embodiment

Figure 18:
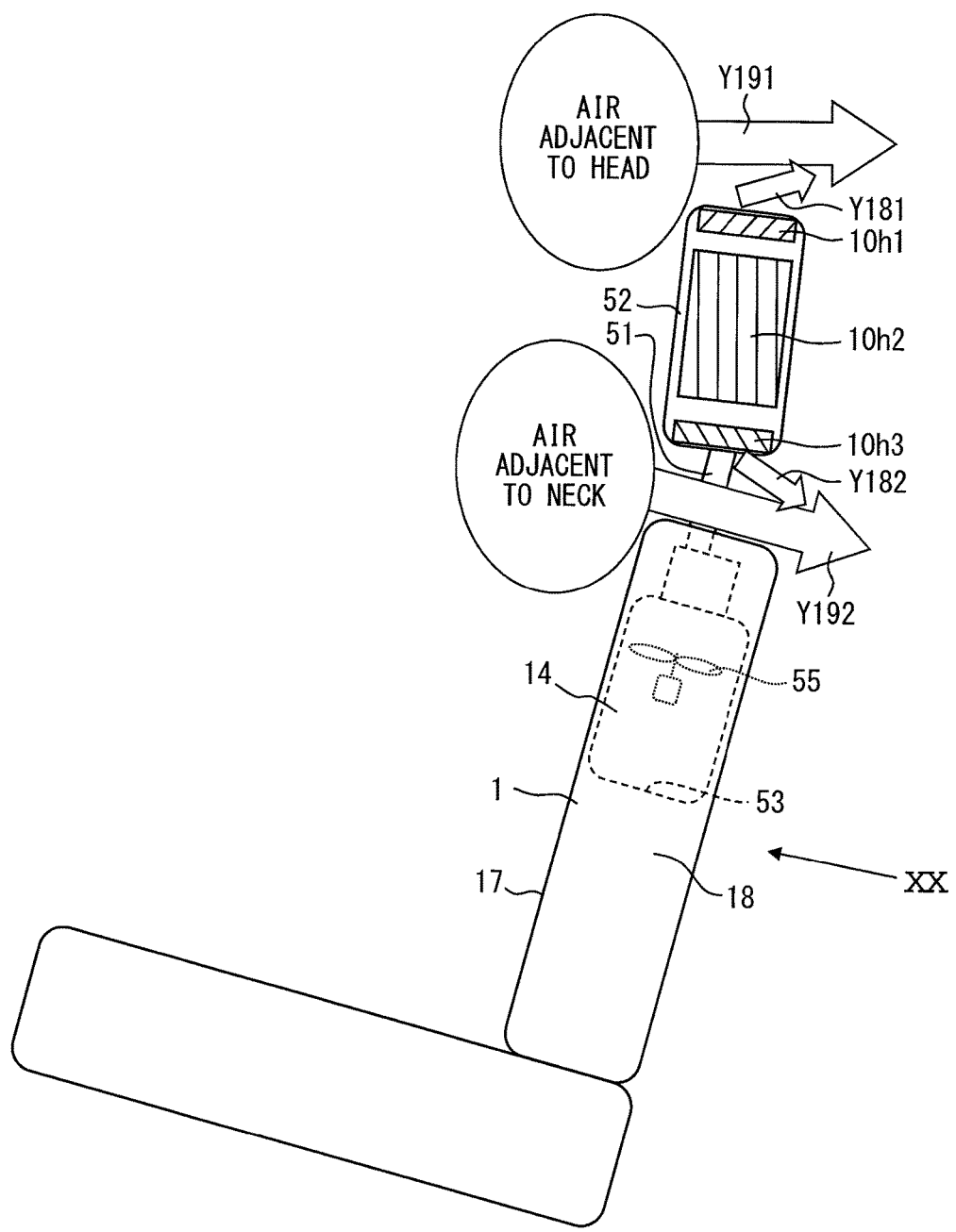
FIG. 18 is a schematic side view of a driver's seat according to an eighth embodiment of the present disclosure.
Figure 19:
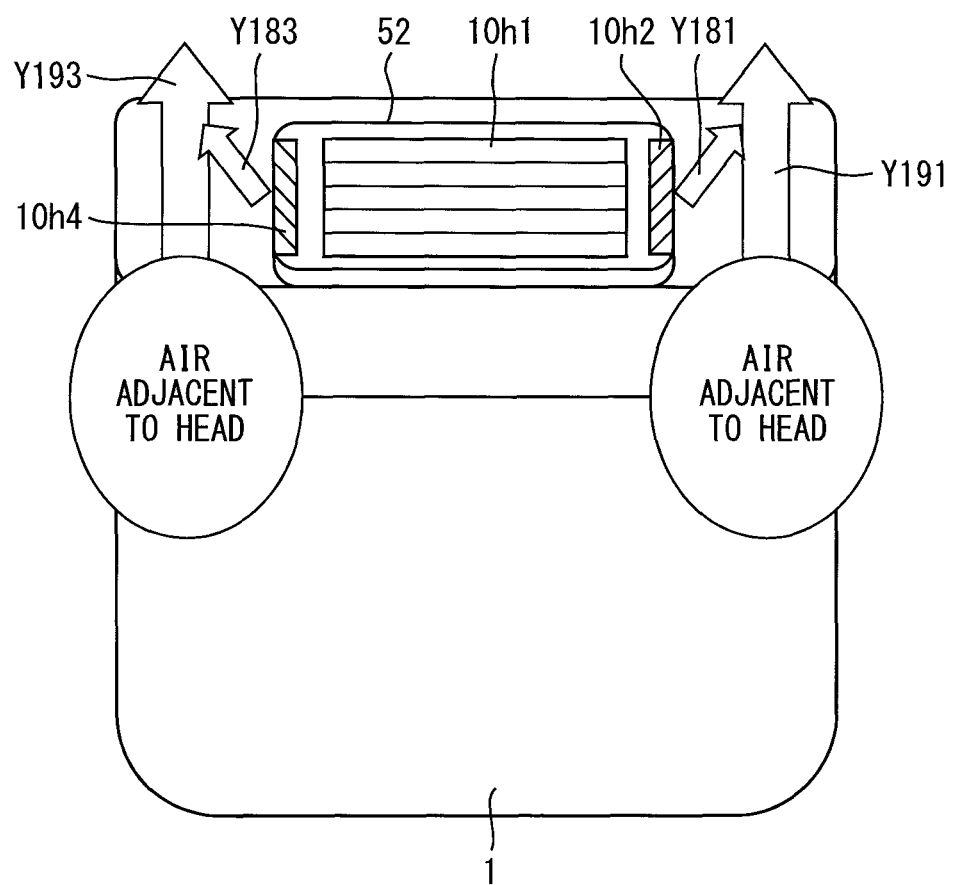
FIG. 19 is a schematic top view of the driver's seat viewed from a ceiling side of a vehicle, according to the eighth embodiment.
Figure 20:
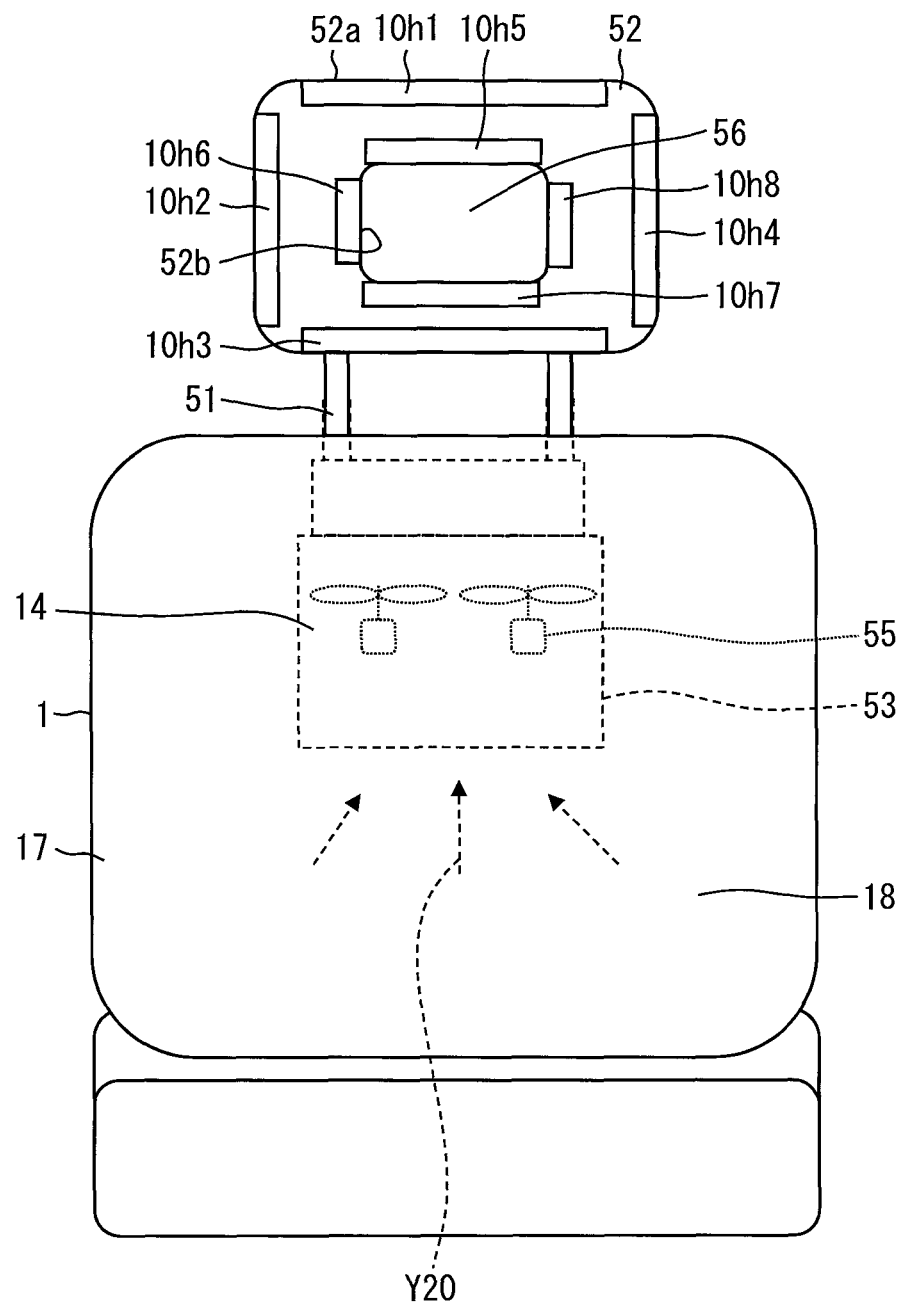
FIG. 20 is a schematic view of the driver's seat viewed from a direction of an arrow XX in FIG. 18, according to the eighth embodiment.

Subsequently, an eighth embodiment of the present disclosure will be described. Portions different from those in the above embodiments will be described. FIG. 18 illustrates the side surface of the driver's seat 1 according to the eighth embodiment of the present disclosure. FIG. 19 illustrates the driver's seat 1 viewed from a ceiling side of the vehicle in a floor direction according to the eighth embodiment. FIG. 20 illustrates the back surface of the driver's seat 1 viewed from a direction of an arrow XX in FIG. 18 according to the eighth embodiment.

In FIG. 18, air outside the seat is sucked into the driver's seat 1 (the same is also applied to the front passenger seat 2) from the porous seat skin 17 (inlet port) as indicated by an arrow Y20. The seat internal fan (circulation fan 14) that blows the sucked air into a head rest fixture 51 is provided. The head rest fixture 51 is formed in a pipe shape or a duct shape so that the air passes through an inside thereof.

As the seat internal fan forming the circulation fan 14, plural axial fans 55 are installed in a porous container 53. With the rotation of the axial fans 55, air that has been sucked through the porous skin 17 and the elastic member (cushion member) 18 of the driver's seat 1 is fed above the container 53.

The fed air is led into a head rest 52 through an inner space of the head rest fixture 51. The head rest 52 has an opening 56 (FIG. 20) in a center thereof to secure occupant's head. The head rest 52 has seat outlet ports 10$h$1, 10$h$2, 10$h$3, 10$h$4, 10$h$5, 10$h$6, 10$h$7, and 10$h$8 in an outer peripheral surface 52$a$ and an inner peripheral surface 52$b$. The seat outlet ports 10$h$1 to 10$h$8 are also collectively called "seat outlet ports 10". The outer peripheral surface 52$a$ and the inner peripheral surface 52$b$ of the head rest 52 may be used as an example of the side surfaces of the seats 1 and 2 extending in the front-rear direction of the vehicle.

A seat louver is provided in each of the seat outlet ports 10$h$1 to 10$h$8, and blows air in the head rest 52 toward the rear seat side in the vehicle interior as indicated by arrows Y181, Y182, and Y183. A head vicinity air (head surrounding air) and a neck vicinity air (neck surrounding air) which are present on the front side of the seat can flow to the rear area of the vehicle as indicated by arrows Y191, Y192, and Y193 due to wind blown out of the seat outlet ports 10$h$1 to 10$h$8. This makes it possible to circulate a comfortable air rearward of the seat to create a vehicle interior environment where there is no air retention (stagnation).

As described above, the seat outlet ports 10$h$1 to 10$h$8 are disposed in the peripheral portion of the head rest 52, and the wind can be sent toward the rear of the occupant's head. This makes it possible to circulate the air present in the vicinity of the occupant's head or the occupant's neck toward the rear area of the vehicle.

Hereinafter, effects of the eighth embodiment will be described. In the above eighth embodiment, the head rest 52 forming a part of the seats 1 and 2 disposed in the vehicle is provided. The seat outlet ports 10 (10$h$1 to 10$h$8) are disposed in the head rest 52 forming a part of the seats 1 and 2 and draw air in the front area of the vehicle to produce an air flow toward the rear of the vehicle by blowing air toward the rear area of the vehicle or diagonally toward the rear area of the vehicle.

The seat outlet ports 10 (10$h$1 to 10$h$8) are disposed on the corner portions or the side surfaces extending in the front-rear direction of the vehicle in the head rest 52 forming a part of the seats 1 and 2, and blow the air at an angle of the drawing of the air in the front area of the vehicle. The head rest 52 configures a part of the seat backs 6 and 8 forming the backrests of the seats 1 and 2.

Ninth Embodiment

Figure 21:
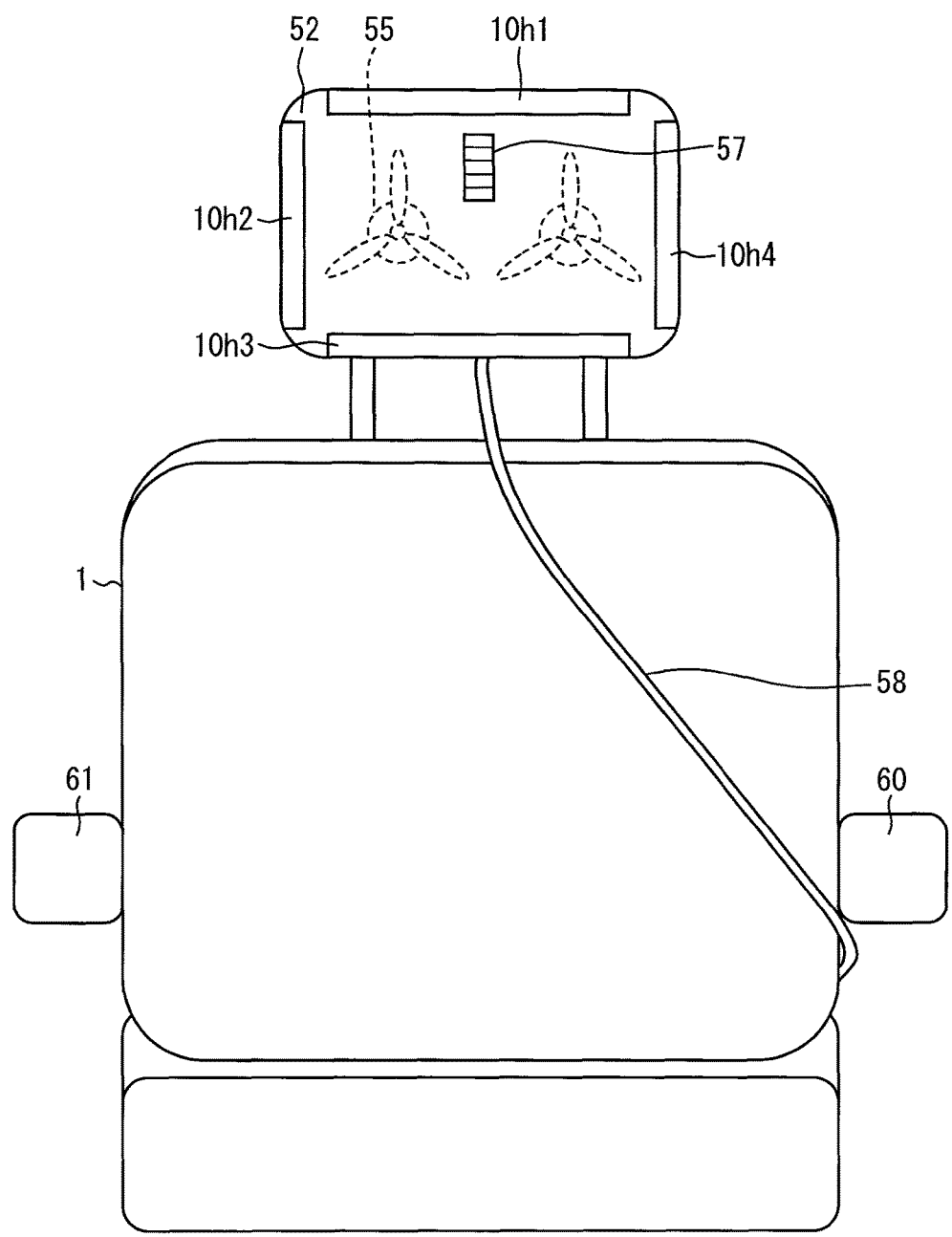
FIG. 21 is a schematic back view illustrating a driver's seat according to a ninth embodiment of the present disclosure.

Subsequently, a ninth embodiment of the present disclosure will be described. Portions different from those in the above embodiments will be described. FIG. 21 illustrates the back surface of the driver's seat 1. Referring to FIG. 21, a head rest 52 as a retrofitted product is mounted on the driver's seat 1 (or the front passenger seat) after removing the head rest 52 as genuine.

Plural axial fans 55 forming the circulation fans are installed within the head rest 52 forming a part of the seat 1. With the rotation of the axial fans 55, the air that has been sucked through the porous skin and the elastic member (cushion member) in the front surface of the head rest 52 (back side of a paper plane in FIG. 21) is blown out of the seat outlet ports 10 (10$h$1 to 10$h$4) disposed in the outer peripheral surface of the head rest 52. The blown air is directed to the rear seat side of the vehicle interior.

The head rest 52 has a switch 57 on the back surface thereof, and the switch 57 turns on to rotate the axial fans 55. The axial fans 55 are powered from a cigarette lighter installed in front of the driver through the switch 57 and a code 58. As described above, because the head rest 52 can be detachably attached, and replaced with the regular product or the retrofitted product, the user per se of the vehicle simply replaces the head rest 52 with another, to thereby easily obtain the circulation effects.

Hereinafter, effects of the ninth embodiment will be described. In the above ninth embodiment, the removable and replaceable head rest 52 forming a part of the seats 1 and 2 disposed in the vehicle is provided. The seat outlet ports 10 (10$h$1 to 10$h$4) are disposed in the head rest 52 forming a part of the seats 1 and 2 and draw air in the front area of the vehicle to produce an air flow toward the rear area of the vehicle by blowing air toward the rear area of the vehicle or diagonally toward the rear area of the vehicle.

The seat outlet ports 10 (10$h$1 to 10$h$4) are disposed on the corner portions or the side surfaces extending in the front-rear direction of the vehicle in the head rest 52 forming a part of the seats 1 and 2, and blow the air at an angle of the drawing of air in the front area of the vehicle. The head rest 52 configures a part of the seat backs 6 and 8 forming the backrests of the seats 1 and 2.

Other Embodiments

The preferred embodiments of the present disclosure have been described in the above embodiments. However, the present disclosure is not limited to the above-mentioned embodiments, and can be variously reformed without departing from the scope of the present disclosure. The structures of the above embodiments are merely exemplary, and technical scopes of the present disclosure are not limited to the disclosed scopes. The scope of the present disclosure is represented by the claims and includes meanings equivalent to those of the claims, and all changes within the scope.

In the above embodiments, the seat air conditioning fans are used as the circulation fans, but dedicated fans for the vehicular air-circulation promotion apparatus may be used without using the wind of the fans for the seat air conditioning. Also, the seat outlet ports are not required to be buried into the seats, but may protrude from the seats. Likewise, the circulation fans may be exposed without being buried into the seats. For example, the circulation fans may be installed within a center console between the respective front side seats. Also, the circulation fans of the driver's seat and the front passenger seat may be configured by a single common fan.

The seat louvers that are disposed in the seat outlet ports, and set the direction of the blown wind may be of a fixed type. It is preferable that the wind blown out of the seat outlet ports is a band-shaped wind, but may be a spotted wind. In addition, the above seat louvers are not essential.

The seat outlet ports 10 and 11 that blow the sucked air from the side surfaces of the seat backs 6 and 8 forming the back rests of the seats 1 and 2 toward the rear area of the vehicle are disposed in the seats 1 and 2, respectively. The air present from the face outlet port 5 to the seats 1 and 2 flows to the rear of the seats 1 and 2 due to the wind blown out of the seat outlet ports 10 and 11. However, for example, a configuration in which the seat outlet port is provided in only the driver's seat 1 is also included in the configuration of the present disclosure.

The window side seat outlet ports 37 and 38 that are disposed in the front side seats, and blow the sucked air to the widow-side side surfaces of the seat backs 6 and 8 to the rear side are provided to assist the wind blown rearward from the side vent outlet ports 35 and 36. Timing of blowing the assist wind, and timing of blowing the wind from the seat outlet ports 10 and 11 disposed on the side surfaces of the respective seat backs 6 and 8 of the driver's seat 1 and the front passenger seat 2 so as to opposed to each other may be controlled, independently. In other words, the timing of blowing the air from the window side seat outlet ports 37 and 38, and the timing of blowing the air from the seat outlet ports 10 and 11 located in the gap 4 between the front side seats 1 and 2 may be shifted to each other. In other words, for example, those two types of air blowing may be alternately performed.

The seats 1 and 2 in the above embodiments suck the air in the vehicle interior from the inlet port 13 (FIG. 3) formed in the contact surfaces of the seats 1 and 2 that come in contact with the occupants as indicated by the arrow Y31. The seat internal air passage that blows the air from the seat outlet ports 10, 11, or the air outlet ports formed except for the inlet port 13 is provided. The seat internal fans disposed in the seat internal air passage are provided. Also, the air flow switching device, which switches the air from the inlet port into either air to the air outlet port or air to the seat outlet ports 10, 11, is provided. The air flow switching device may be configured with the use of a mechanism for partially blocking the wind such as a dumper or a film door.

The vehicular air-circulation promotion apparatus according to the present disclosure may not be the seat ventilation system of the type that sucks the air from the skin of the seat. The vehicular air-circulation promotion apparatus according to the present disclosure may be integrated with a seat ventilation system of the type that discharges air from the skin of the seat, or the seat air conditioner having a heat exchanger or a Peltier element in the seat. The air is discharged from the seat skin, and the seat outlet port is provided in a seat edge of the front side seats to also blow the wind from the seat edge, thereby being capable of promoting the circulation of the comfortable air from the front seat to the rear seat. As a result, a cold air or the like from the vehicle air conditioner can be easily allowed to reach the rear seat with the use of the viscosity of air.

In the seat ventilation system or the seat air conditioner of the type that sucks air from the seat skin, because the sucked cold air is warmed by a heat loss of the seat and the heat of the occupant, a temperature of air of a discharge destination of the sucked air rises. However, with the use of the apparatus according to the present disclosure, the wind from the seat outlet port is mixed with the cold air blown out of the vehicle air conditioner, thereby being capable of blowing the comfortable air rearward. Therefore, there is also advantage that processing of the discharge air from the inside of the seat is not bothered.

Also, an output balance of air blowing from a pair of seat outlet ports may change in response to a request from the occupant in each of the right and left rear side seats so that a larger amount of air can be blown to the right side or the left side of the rear seats requiring the cold air. For example, an air blowing direction can change, or the air blowing direction can swing under intentional control so that the amount of air blown out of the seat outlet port 10 of the driver's seat 1 and the amount of air blown out of the seat outlet port 11 of the front passenger seat 2 become unbalanced with each other. The seat outlet ports that are disposed in the seats, and blow the air toward the rear area of the vehicle may be disposed in arm rests 60 and 61 (FIG. 21) configuring a part of the seats.

Figure 22:
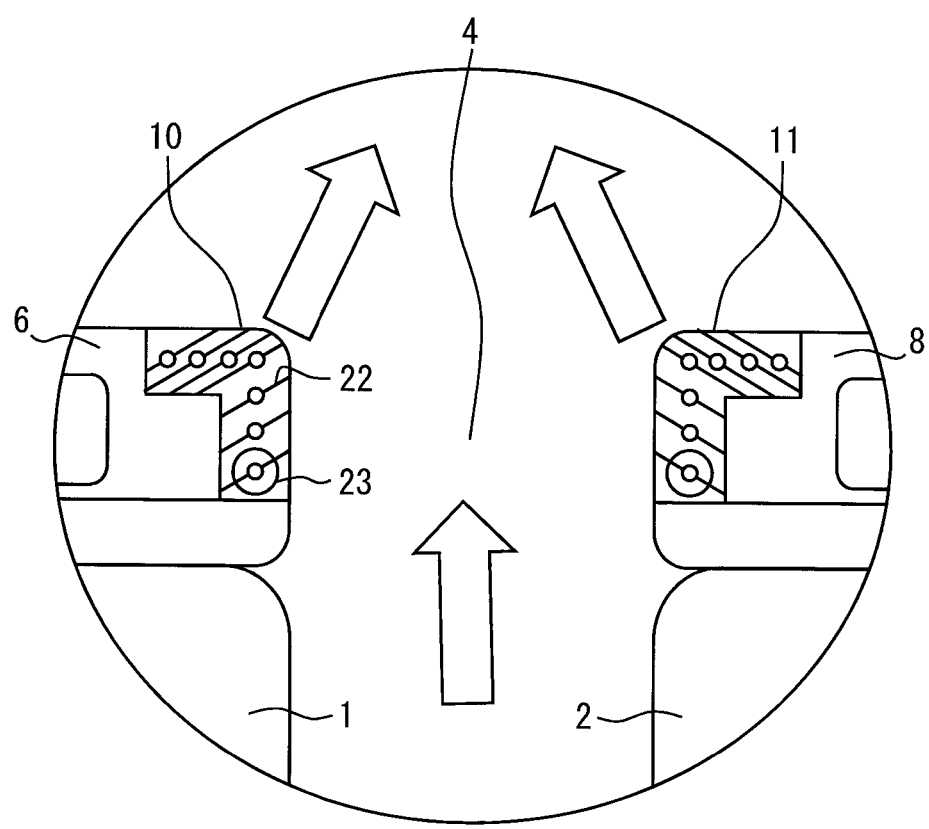
FIG. 22 is a partially enlarged view schematically illustrating an internal configuration of a seat and a blown wind according to a modification of the present disclosure.

In the above embodiments, the seat outlet ports 10 and 11 are provided on the corner portions or the side surfaces extending in the front-rear direction of the vehicle in the seats 1 and 2. However, as illustrated in FIG. 22, the seat outlet ports 10 and 11 may be disposed on both of the corner portions or the side surfaces extending in the front-rear direction of the vehicle in the seats 1 and 2.

What is claimed is:

1. An air-circulation promotion apparatus for a vehicle, comprising:
   a seat disposed in the vehicle;
   a seat outlet port provided in the seat;
   an inlet port provided on a front side of the seat;
   a face outlet port disposed frontward of the seat;
   a swing louver disposed in the face outlet port and moved to control a direction of air blown out of the face outlet port;
   a sensor that detects motion of the swing louver; and
   a control unit configured to control the seat outlet port, wherein
   the seat outlet port is provided in at least one of a corner portion and a side surface of the seat, the side surface extending in a front-rear direction of the vehicle,
   the seat outlet port is configured to draw an air in a front area of the vehicle from the inlet port through the seat and blow the air toward a rear area of the vehicle or diagonally toward the rear area of the vehicle,
   the seat outlet port includes:
      a seat louver that rotates to control a direction of the air flow blown out of the seat outlet port; and
      a louver drive device located on an end of the seat louver in a rotationally axial direction of the seat louver, the louver drive device controlling rotation of the seat louver, and the control unit is configured to control the louver drive device to drive the seat louver in accordance with the motion of the swing louver based on a signal from the sensor.

2. The air-circulation promotion apparatus for a vehicle, according to claim 1, wherein the seat outlet port is provided in the corner portion of a seat back of the seat and blows the air diagonally toward the rear area of the vehicle.

3. The air-circulation promotion apparatus for a vehicle, according to claim 1, wherein the seat outlet port is provided in the side surface of a seat back of the seat, the side surface of the seat back extends in the front-rear direction of the vehicle, and the seat outlet port blows the air from the side surface of the seat back toward the rear area of the vehicle or diagonally toward the rear area of the vehicle.

4. The air-circulation promotion apparatus for a vehicle, according to claim 3, wherein the seat includes a driver's seat and a front passenger seat, and the seat outlet port of the driver's seat and the seat outlet port of the front passenger seat are opposed to each other.

5. The air-circulation promotion apparatus for a vehicle, according to claim 1, further comprising:
    a vehicle air conditioner that is disposed frontward of the seat, and includes the face outlet port; and
    the control unit that controls the seat outlet port to blow an air along a flow of conditioned air blown out of the face outlet port when the conditioned air is blown out of the face outlet port toward the rear area of the vehicle during operation of the vehicle air conditioner.

6. The air-circulation promotion apparatus for a vehicle, according to claim 5, wherein
    the seat includes a driver's seat and a front passenger seat,
    the face outlet port has a center vent outlet port that blows the air between the driver's seat and the front passenger seat, and
    the seat outlet port faces a flow path of the air blown out of the center vent outlet port.

7. The air-circulation promotion apparatus for a vehicle, according to claim 5, wherein the control unit controls the seat outlet port to blow the air when an operation mode of the vehicle air conditioner is a face mode in which the air is blown out of the face outlet port.

8. The air-circulation promotion apparatus for a vehicle, according to claim 5, wherein
    the vehicle air conditioner includes a side vent outlet port that blows the air to a lateral side of the vehicle,
    the seat outlet port is provided in the side surface of the seat, and the side surface is positioned adjacent to the lateral side of the vehicle, and
    the seat outlet port blows the air rearward from the side surface of the seat and assists the air flow blown out of the side vent outlet port rearward.

9. The air-circulation promotion apparatus for a vehicle, according to claim 5, wherein
    the seat includes a driver's seat and a front passenger seat,
    the face outlet port has a center vent outlet port that blows the air toward the driver's seat and the front passenger seat, and
    the seat outlet port faces a flow path of the air blown out of the center vent outlet port.

10. The air-circulation promotion apparatus for a vehicle, according to claim 1, comprising:
    a circulation fan disposed between the inlet port and the seat outlet port so as to blow the air, drawn through the inlet port, out through the seat outlet port.

11. The air-circulation promotion apparatus for a vehicle, according to claim 10, wherein the circulation fan has an in-seat fan incorporated into the seat,
    the air-circulation promotion apparatus further comprising an air flow switching device that switches an air flow from the in-seat fan to either an air flow blown out through a seat skin of the seat or an air flow blown out through the seat outlet port.

12. The air-circulation promotion apparatus for a vehicle, according to claim 1, wherein the seat outlet port is connected with a seat internal duct that extends diagonally toward the rear area of the vehicle, and a direction of an air flow blown out of the seat internal duct is set diagonally rearward.

13. The air-circulation promotion apparatus for a vehicle, according to claim 1, wherein the seat outlet port is provided in a rear corner portion of the side surface of a seat back of the seat.

14. The air-circulation promotion apparatus for a vehicle, according to claim 1, wherein the seat outlet port is provided in a side corner portion of a rear surface of a seat back of the seat.

15. The air-circulation promotion apparatus for a vehicle, according to claim 1, wherein the seat outlet port is provided in a head rest of the seat.

16. The air-circulation promotion apparatus for a vehicle, according to claim 1, wherein the inlet port is further provided on a front portion of a seat back of the seat.

17. The air-circulation promotion apparatus for a vehicle, according to claim 16, wherein the inlet port further comprises a porous seat skin.

18. The air-circulation promotion apparatus for a vehicle, according to claim 1, wherein
    the seat louver is one of a plurality of seat louvers interlocked and rotated together, and
    one of the plurality of seat louvers is driven by the louver drive device.

19. The air-circulation promotion apparatus for a vehicle, according to claim 1, wherein
    the seat is configured to let the drawn air flow out through the seat outlet port when the seat outlet port is opened by the seat louver, and
    the seat is configured to let the drawn air flow out through a seat skin of the seat when the seat outlet port is closed by the seat louver.

20. The air-circulation promotion apparatus for a vehicle, according to claim 19, wherein the inlet port is located in the seat skin.

* * * * *